United States Patent [19]
Billings et al.

[11] Patent Number: 5,221,159
[45] Date of Patent: Jun. 22, 1993

[54] SUBSURFACE CONTAMINANT REMEDIATION, BIODEGRADATION AND EXTRACTION METHODS AND APPARATUSES

[75] Inventors: Jeffery F. Billings; Gale K. Billings, both of Albuquerque, N. Mex.

[73] Assignee: Environmental Improvement Technologies, Inc., Albuquerque, N. Mex.

[21] Appl. No.: 712,919

[22] Filed: Jun. 7, 1991

Related U.S. Application Data

[63] Continuation-in-part of Ser. No. 500,767, Mar. 28, 1990, abandoned.

[51] Int. Cl.⁵ .................... E21B 36/00; E21B 43/00; E21B 43/43
[52] U.S. Cl. .................................. 405/128; 166/246; 435/266
[58] Field of Search ............... 435/248, 249, 266, 313; 210/610; 405/128-131; 166/246

[56] References Cited

U.S. PATENT DOCUMENTS

| | | |
|---|---|---|
| Re. 33,102 | 10/1989 | Visser et al. .................. 166/267 |
| 2,523,091 | 9/1950 | Bruce ............................... 166/2 |
| 2,969,226 | 1/1961 | Huntington ...................... 262/3 |
| 3,216,905 | 11/1965 | Baptist ............................. 195/2 |
| 3,351,132 | 11/1967 | Dougan ............................ 166/11 |
| 3,665,716 | 5/1972 | Rogers et al. . |
| 3,743,582 | 7/1973 | Kitai et al. .................. 435/313 X |
| 3,828,525 | 8/1974 | Copa et al. ....................... 55/68 |
| 3,846,290 | 11/1974 | Raymond ........................ 210/11 |
| 4,126,556 | 11/1978 | Swanson et al. .............. 210/242 |
| 4,183,407 | 1/1980 | Knopic ........................... 166/314 |
| 4,241,787 | 12/1980 | Price .............................. 166/105 |
| 4,249,605 | 2/1981 | Slater et al. ................... 166/266 |
| 4,289,204 | 9/1981 | Stewart ........................... 166/303 |
| 4,296,810 | 10/1981 | Price .............................. 166/265 |
| 4,303,127 | 12/1981 | Freel et al. .................... 166/266 |
| 4,323,122 | 4/1982 | Knopic ........................... 166/267 |
| 4,401,569 | 8/1983 | Jhavari et al. ................. 210/610 |
| 4,435,292 | 3/1984 | Kirk et al. ...................... 210/747 |
| 4,442,901 | 4/1984 | Zison .............................. 166/369 |
| 4,469,176 | 9/1984 | Zison et al. ..................... 166/250 |
| 4,518,399 | 5/1985 | Croskell et al. ................... 55/16 |
| 4,544,381 | 10/1985 | Schmidt ..................... 435/266 X |
| 4,588,506 | 5/1986 | Raymond et al. .............. 210/606 |
| 4,593,760 | 6/1986 | Visser et al. ................... 166/267 |

(List continued on next page.)

FOREIGN PATENT DOCUMENTS 3427532 8/1985 Fed. Rep. of Germany ...... 405/131

OTHER PUBLICATIONS

"Remedial Action Technology for Waste Disposal Sites" by Rogoshewski et al.; Noyes Data Corporation (1983), pp. 259-269.

(List continued on next page.)

Primary Examiner—Dennis L. Taylor
Assistant Examiner—John Ricci
Attorney, Agent, or Firm—Deborah A. Peacock; Rod D. Baker

[57] ABSTRACT

Methods and apparatuses for removing contaminants from soil and an associated subsurface groundwater aquifer. An injection well(s) is drilled through the vadose zone to a depth below the water table defining the upper boundary of the aquifer. An extraction well is established to a depth above the water table. Oxygenated gas is injected under pressure through the injection well while a vacuum is applied to the extraction well. Contaminants are removed from the groundwater aquifer and from the vadose zone by a combination of physical, chemical, and biochemical processes. Additional biochemical cleansing may occur at ground level prior to venting of extracted, contaminated air. Relatively pure liquid contaminant may be extracted simultaneously with cleansing of the soil above the aquifer. Microbes natural to the contaminated site are extracted, analyzed, fermented, and reintroduced to enhance biodegradation. Should it become necessary because of decrease in contamination and consequent decrease in microbes, an alternate food source is supplied to the microbial population to sustain high levels of degradation activity.

30 Claims, 32 Drawing Sheets

U.S. PATENT DOCUMENTS

| | | | |
|---|---|---|---|
| 4,660,639 | 4/1987 | Visser et al. | 166/267 |
| 4,662,900 | 5/1987 | Ottengraf | 55/90 |
| 4,713,343 | 12/1987 | Wilson, Jr. et al. | 435/264 |
| 4,723,468 | 2/1988 | Schippert et al. | 435/266 X |
| 4,723,968 | 2/1988 | Schippert et al. | 55/80 |
| 4,730,672 | 3/1988 | Payne | 166/266 |
| 4,745,850 | 5/1988 | Bastian et al. | 98/56 |
| 4,765,902 | 8/1988 | Ely et al. | 210/610 |
| 4,806,148 | 2/1989 | Ottengraf | 435/266 X |
| 4,832,122 | 5/1989 | Corey et al. | 166/266 |
| 4,842,448 | 6/1989 | Koerner et al. | 405/258 |
| 4,850,745 | 7/1989 | Hater et al. | 405/258 |
| 4,872,994 | 10/1989 | Jakob | 210/691 |
| 4,890,673 | 1/1990 | Payne | 166/266 |
| 4,982,788 | 1/1991 | Donnelly | 405/131 |
| 5,076,727 | 12/1991 | Johnson et al. | 405/128 |
| 5,080,793 | 1/1992 | Urlings | 435/266 X |

OTHER PUBLICATIONS

"SVVS Remediation Technology," Billings & Assoc. (1990).

"Developments in Remeidiation" Billings & Assoc. (1990).

Perodical, "Air sparging Improves Effectiveness of Soil Vapor Extraction Systems", *The Hazardous Waste Consultant*, vol. 9, Issue 2, pp. 1.1–1.4 (Mar./Apr. 1991).

Marley, Michael C., "Air Sparging in Conjunction with Vapor Extraction for Source Removal at Voc Spill Sites," *5th National Outdoor Action Conference*, Nat'l Water Well Assn, pp. 89–101 (1991).

Yaniga, et al., "Restoration of Water Quality in a Multiaquifer System Via Insitu Biodegradation of the Organic Contaminants", *5th Nt'l Symp, Nat'l Water Well Assn*, pp. 510–526 (1985).

Coia, et al., "Soil Decontamination Through in Situ Air Stripping of Volatile Organics—A Pilot Demo.", *Proceedings of the Nat'l Water Well Assn/Amer. Petroleum Inst. Conf.*, pp. 555–564 (1985).

Regalbuto, et al., "In-Situ Removal of Voc's by Means of Enhanced Volatilization", *Proc. Petrol. Hydrocarbons and Organic Chem in Ground Water*, Assn of Ground Water Sci., pp. 571–590 (1988).

Gudemann, et al., "In Situ Remediation of Voc Contaminated Soil and Groundwater by Vapor Extraction and Groundwater Aeration", *Haztech International '88*, Conference Proceedings, pp. 2A-90 through 2A-111 (1988).

FIG—21

SUBSURFACE CONTAMINANT REMEDIATION, BIODEGRADATION AND EXTRACTION METHODS AND APPARATUSES

CROSS-REFERENCE TO RELATED APPLICATIONS

This application is a continuation-in-part application of U.S. patent application Ser. No. 07/500,767, entitled *Subsurface Volatilization Method and System*, to Jeffery F. Billings, filed on Mar. 28, 1990, now abandoned, the teachings of which are incorporated herein by reference.

BACKGROUND OF THE INVENTION

1. Field of the Invention (Technical Field)

The present invention relates generally to methods and apparatuses for in situ remediation of organic products, such as hydrocarbons, and inorganic products, such as metals, from subsurface soil and groundwater. In situ remediation of excavated materials also may be conducted by the present invention.

2. Background Art

The remediation of contaminated soil and groundwater has become an international priority. Subsurface soil and groundwater are contaminated with organic and inorganic products in a number of ways.

Contamination by petroleum products, including gasoline, diesel fuel, and heating oil, is an ubiquitous problem, particularly by leakage from underground storage tanks. In addition, spills and improper disposal of petroleum products cause many contaminated sites.

The Federal Agency in charge of clean-up of underground storage tank spills, which regulates only a portion of the hydrocarbon spills in the United States, has estimated that there are a minimum of 400,000 leaking tanks. A relatively low figure for average costs of clean-up of an underground storage tank leak is approximately $200,000. Remediation technology is of significant importance to the taxpayers of the nation as well as industry.

In addition to petroleum products, contamination by other organic products occurs at numerous contaminated sites. Examples of such other organic contaminants are halogenated hydrocarbons, such as trichloroethylene (TCE), carbon tetrachloride, and methylene chloride, which have been used for many years as degreasers in various industries. Alcohols, ketones, esters, aromatics, olefins, alkanes and other organic compounds and families of compounds are also widely used in industry and consequently contaminate various sites. The present invention is capable of remediation of any hydrocarbon product which may be bioremediated. Such hydrocarbon products consist of the majority of natural and man-made organic materials.

The major remediation technologies applied to in situ hydrocarbon contamination earlier in the history of such remediation were extraction, that is excavation of contaminated soil, and a technology known as "pump and treat." "Pump and treat" technology consists of pumping water out from underground and treating it above ground. A third major technology, used later in the history of remediation, is vacuum extraction. These technologies were not particularly successful and were extremely expensive. The technology of excavation is now being phased out by regulatory action in most states because it simply consisted of digging up contamination and placing it elsewhere. On occasion, excavation was followed by remediation above ground on the site or in a particular remediation facility. This approach is still being used and is useful. In fact, the present invention has the capability of providing the remediation above ground for such excavations or at a regional, above ground, encapsulated treatment facility. However, excavations are also extremely expensive and quite often can not reach deep enough to totally remediate the site. Furthermore, excavations often endanger surface structures due to weakening of the subsurface below them. Therefore, the percentage of contaminated sites which can in fact be remediated by excavation is fairly small, on the order of 10% to 15%.

With respect to "pump and treat" technology, it has been and continues to be the most often applied technology. However, practitioners in the art have determined that "pump and treat" technology is inefficacious. It often extends to tens or hundreds of years to reach statutory clean-up requirements. Because overall project costs are related to the length of the project, "pump and treat" technology is often virtually the most expensive technology which could be applied.

The third alternative, vacuum extraction of soil contamination, is being applied more consistently throughout the country at the present time. It has a higher rate of success, probably on the order of forty to sixty percent, if the criteria is removal of the contamination down to statutory levels Vacuum extraction would be exceedingly successful if the only concern was subsurface vapors. However, this is not the only concern with respect to remediation of a site. As currently used by most practitioners, vacuum extraction technology is a high volume extraction. The present invention uses a low volume approach for the purpose of allowing bioremediation and for the purpose of controlling the amount of contaminants passed out to the atmosphere as stack or vent gases. High volume vacuum extraction exceeds air quality standards and thus requires expensive air treatment. The air treatment is often as costly as the original remediation itself. The reason that soil vacuum extraction fails to completely remediate the majority of sites is the fact that it is dependent for its physical success on the diffusion rate of volatile compounds from within the liquid contamination to the interface with the vapor phase. This diffusion is extremely slow. This means that one consistently gets a vent gas emission curve that is very high for a few months and then drops rapidly to an extremely low remediation rate. Again, we see the effects of time and concomitant increased total cost. Pure soil vacuum extraction technology is a long-term process if one wishes to remove the residual, liquid contamination by waiting for it to diffuse volatiles to the vapor phase. Secondly, this technology tends to fail if the contamination is not made up entirely of highly volatile compounds because that is all the vacuum addresses. An example of a low volatile compound that is difficult to remediate by pure vacuum extraction is diesel fuel. Thirdly, vacuum extraction only occurs above the water table and thus has a strong tendency to fail to clean contaminated ground water.

A further technology, air stripping of contaminated water at the surface of the ground, is a long practiced art. It depends on a high air-to-water ratio and is controlled by the rate of movement of the contaminant from the water phase into the vapor phase, whereupon the contaminant is exhausted to the air.

A fifth technology, bioremediation, is a theoretically successful technology but is failing in general because of the problems of high costs and difficult physical delivery of the components that would support the bioremediation.

The present invention overcomes the limitations expressed above of the prior technology. The invention employs the advantageous activities of vacuum and of air stripping and combines them with the theoretically valuable remediation technology known as bioremediation. In essence, the invention provides an integrated system capable of delivering the necessary chemical and physical components of a remediation technology to the various parts of contamination underground in ratios that allow maximum remediation stress on the contamination. Unlike with the prior art, remediation stress is variable throughout the plumes of contamination to address the plumes' changing characteristics.

Inorganic products, such as iron, manganese, chromium, selenium, and nitrates, cause contamination problems as well. Common and dangerous inorganics are spilled by industry, requiring clean-up of the underlying soil and groundwater. Inorganic compounds such as discussed above are highly receptive to precisely the same design and installation characteristics of the present invention discussed for hydrocarbon remediation above.

The majority of heavy metals such as iron, manganese, nickel, cobalt and chromium are all precipitated into insoluble oxides and hydroxides at a high oxygen content of groundwater. This is otherwise known as a high redox potential. The high redox potential in contaminated groundwater is achieved by the air injection portion of the current invention. In addition, the precipitation of metals by the activity of microbes is a well known phenomena. This is often used in mining by microbiological processes. In this case, the microbes are unlikely to be common soil microbes and therefore non-indigenous microbes must often be used.

Nitrate contamination in groundwater is of serious concern because of health problems associated with this compound. Nitrate remediation can be accomplished through the exact same physical system for hydrocarbons. However, the chemical processes are reversed. Instead of adding oxygen to cause oxidation, what is necessary is to add a hydrocarbon or naturally occurring organic as a food source to microbes and encourage them to make use of the oxygen in the nitrate compound. In this case, a gas develops, nitrogen, whose release from the site is controlled by the vacuum of the system.

The United States and other countries need effective and economic methods for the in situ removal of such organic and inorganic contaminants in order to avoid the extraordinarily high cost, effort, and the time required to excavate and either replace or decontaminate contaminated soil sites, as well as to employ other existing methods. The prior art does not present efficient and effective methods.

For example, U.S. Pat. No. 4,730,672, to Payne, discloses a closed-loop process for removing volatile contaminants. Payne deals strictly with volatile contaminants whereas, in fact, the majority of hydrocarbon contamination sites are made up of non-volatile constituents. It is these non-volatile constituents which must be attacked by bioremediation. This statement is particularly true if the contamination occurred several years before bioremediation, which is faced in the majority of sites across the United States. In Payne, a withdrawal well is surrounded by multiple injection wells. Pressurized air is injected into the ground water through the injection wells, and is withdrawn under vacuum from the withdrawal well. The output of the withdrawal well is connected to the input of the injection wells through a series of scrubbers, condensers, and neutralizers which remove contaminants from the air stream. The recycling of air through the system increases the likelihood of contaminating the groundwater through the injection wells. The process of recycling, as portrayed in Payne, provides only for volatiles and not non-volatiles, which are more abundant, and is unacceptable by regulatory agencies in the majority of states.

U.S. Pat. No. 4,765,902, to Ely, et al., discloses a process for remediation of hydrocarbon contaminants in soil. A borehole is extended down to a water table beneath a contaminated vadose zone. This borehole is then evacuated in a controlled manner so as to draw air through the vadose zone, causing hydrocarbon contaminants in the vadose zone to be volatilized and drawn up the borehole. The present invention is an integrated system and is not restricted to partial remediation of the site as is the process of Ely. The patent of Ely provides for removal of volatiles only.

U.S. Pat. No. 4,745,850, to Bastian, et al., discloses a wind-driven, self-ventilating system for extracting volatile organics from soil. A wind-driven turbine is positioned over a well bore. The well bore extends downwardly to a bore or conduit which extends generally horizontally through a contaminated soil zone, and which is connected to one or more air intake boreholes. The wind-driven turbine draws air through the boreholes and the horizontal conduit, thereby drawing volatile contaminants from the surrounding soil. This patent, therefore, discusses a process which in fact addresses only the minor parts of the needed remediation process. It is essentially a soil vacuum technique and therefore fails in a majority of cases to totally remediate the soil residual and to effectively remediate contaminated groundwater. This process is what is called in the industry a passive soil venting technique. It has a very high failure rate because it does not evacuate sufficiently and strenuously and deals only with vapor contamination and not other types of contamination. Passive soil venting systems are not acceptable to the majority of state regulatory agencies. Bastian does not provide for remediation of ground water, free-product, or of non-volatile components.

U.S. Pat. No. 4,588,506, to Raymond et al., discloses the injection of a dilute solution of hydrogen peroxide into a contaminated soil formation for the purpose of stimulating the biodegradation of organic contaminants in the soil. The process is supplemented by the intermittent spiking of the hydrogen peroxide concentration, after biodegradation is complete in a selected area, for the purpose of killing and thereby removing the biota in the selected area and thereby increasing the permeability of the soil. The process discussed in this patent is the addition of oxygen in the form of hydrogen peroxide to groundwater. It has the advantages of stimulating biodegradation. It has seldom been successful because of the difficulty of delivery of the oxygen throughout the system. This patent depends on hydrologic management of the subsurface which is a very complicated and difficult process that is similar to the difficulties that are experienced in "pump and treat." The few times this process has been successful has generally been so at exorbitant costs. For example, one site was cleaned to standards in California by the use of hydrogen peroxide. The hydrogen peroxide costs alone, not including all the hydrologic manipulation costs, was over $400,000. Hydrogen peroxide is an expensive chemical in large volumes. It is also an explosive chemical and this increases risks and costs at the site. A much less costly and more controllable use of oxygen is by air injection, as with the present invention. Raymond does not provide for remediation of free-product, vapors, or soil residual.

U.S. Pat. No. 4,401,569, to Jhaveri, et al., discloses a process of removing contaminated groundwater from a soil formation, treating it with nutrients and microorganisms to cause biodegradation of the contaminants, and returning the treated water to the soil formation. The treated water also contains nutrients and microorganisms, thereby further facilitating in situ decontamination of water in the formation. This method is expensive in that it requires removal and reinjection of water. This process of the Jhaveri patent is essentially a "pump and treat" process. It therefore fails from the standpoint of all "pump and treat" systems and has a very low probability of success and a very slow rate of success, as discussed above. Further, indigenous microorganisms are not controlled and used as they are in the process proposed herein. Injection of non-indigenous microorganisms is not acceptable to the majority of state regulatory agencies. The injection of combined nutrients and microorganisms quite often yields a biologic bloom around the well which decreases permeability and decreases or causes a cessation of the process. The present invention does not inject nutrients through the air injection wells for this very reason and allows the other nutrients in the groundwater and in the soil moisture to control the rate of the process. This avoids costly failures caused by biologic bloom around the injection well. Jhaveri does not provide for treatment of vapors, free-product, or soil residual.

U.S. Pat. No. 3,846,290, to Raymond, discloses a process for reclamation of groundwater contaminated with hydrocarbons. In accordance with the method of this patent, nutrients and oxygen are injected into a contaminated subsurface groundwater aquifer through an injection well located near a producing well. The nutrients and oxygen stimulate naturally occurring microorganisms in the water to consume hydrocarbon contaminants. Additionally, the injection of nutrient-bearing water into the aquifer causes a flow of water from the injection well to the producing well, whereby the producing well continuously draws decontaminated water from the aquifer. Although the method of the Raymond patent is intended to purify water in a subsurface aquifer for subsequent production it does not remove contaminants in the overlying vadose zone, nor does it disclose use of injected microorganisms, nor does it remediate vapors, free-product, or soil residual.

U.S. Pat. No. 3,665,716, to Rogers, discloses the removal of noxious gases from an underground refuse disposal cavity. The extracted air is conveyed to a purification facility where it is purified and then released to the atmosphere. This method is not directed to removal of contaminants from the soil surrounding the cavity or from groundwater. Rogers relates only to vacuum extraction techniques which have been discussed above.

U.S. Pat. No. 4,435,292, to Kirk, et al., discloses a method for injecting flushing fluid into a contaminated zone, collecting the liquid after flushing through the zone, and treating the liquid to extract contaminants. The system is closed in that the flushing fluid is repeatedly reinjected into the contaminated zone. The Kirk patent is in fact a "pump and treat" technology and suffers from all of the problems associated with hydrologic management in the "pump and treat" technology, which has failed to provide cost effective and rapid clean-up in most cases. In many states, regulations require very expensive treatment of water reinjected or discharged. The current invention avoids this cost entirely. Kirk does not address free-product, soil residuals, or vapor contaminants.

U.S. Pat. No. 4,183,407, to Knopik, U.S. Pat. No. 4,842,448, to Koerner, et al., and U.S. Pat. No. 4,593,760, to Visser, et al., disclose methods of extracting volatile contaminants from a vadose zone by vacuum pumping. The method of Koerner comprises sealing the surface surrounding an extraction pump intake. Knopik employs horizontal collection shafts. Visser requires the use of various fill materials in the extraction well. The patents of Knopik, Koerner, and Visser disclose pure vacuum extraction. This technology has been discussed above and has a high failure rate with respect to removal of all forms of underground contamination. In addition, the current invention involves vacuum for the purpose of controlling vapors that are generated by the rest of the remediation system and not solely for the purpose of vacuum extraction of volatiles.

U.S. Pat. No. 4,832,122, to Corey, et al., discloses a method for in situ remediation of groundwater contaminated by volatile contaminants by pumping fluid via a first pump to an area beneath the water table, the fluid filtering up through the contaminated zone and being pumped out from above the contaminated zone by a second pump. The method employs horizontal distribution and collection shafts. The method of Corey involves vacuum extraction above the water table and air injection below the water table in a design around the contamination. Such a technology will contain most of the contamination on most sites and not allow it to migrate further. However, this technology will not allow remediation of the contamination itself. Therefore, the method of Corey depends on allowing natural degradation to remediate the contamination. This process takes on the order of decades because of the loss of oxygen within the contamination itself, thus reducing biological activity. Furthermore, Corey addresses the remediation of the volatile portion of contamination only. As discussed above, this is the minor portion of most hydrocarbon contamination sites.

U.S. Pat. No. 4,249,605, to Slater, et al., discloses a method of separating oil and water within oil wells by application of heat provided by a solar furnace. The system requires injection of water below the surface. In many states this is either forbidden or heavily regulated with subsequent heavy costs on the remediation technology of the site. The current invention uses heat for biological stimulation and is not concerned with the process of separating oil and water by the use of heat.

U.S. Pat. No. 4,289,204, to Stewart, et al., discloses a method of treatment of crude oil, well fluids, and well equipment via a solar heater. The heat helps demulsify and remove paraffin from an oil well. Stewart applies heat in the form of solar heat for the purpose of breaking down paraffins and causing them to flow more readily and become collectable in an oil well. The present invention does not use heat for the breakdown of organic constituents. Paraffins which are present in hydrocarbon contamination are removed in the current invention through the effects of bioremediation.

U.S. Pat. No. 4,850,745, to Hater, et al., discloses a method for bioremediation of petroleum-contaminated soil adjacent to an excavated cavity by provision of microbes, air and nutrients. Microorganisms are provided in dry form to the bottom of the excavated cavity then covered with gravel, a nutrient-providing pipeline, and further dirt and gravel. Hater has the advantage of using bioremediation at the site. However, it requires excavation prior to its application. The problems with excavation have been discussed above. They include excessive costs unless the contamination is quite small and quite shallow, the lack of acceptance of most regulatory state agencies of placing the contaminated excavated soil in landfills, the need to treat the excavated soil above the surface which increases project costs, and the restriction of excavation to those areas that do not entail potential structural damage due to the excavation. The net result of these constraints on excavation causes excavation to be a minor remediation technology throughout most of the United States. Therefore, the Hater method is severely restricted in its actual applicability, which is not the case with respect to the current invention. Furthermore, the Hater patent does not deal with ground water contamination because of the difficulty of excavation below the water table. Furthermore, Hater is limited in space and time by the travel velocity of the microbial population. This has been estimated to be on the order of from five to ten feet per year, except under very unusual circumstances. Therefore, the method proposed in Hater will not totally remediate a site unless contamination is located very close to the excavation. One must add the necessity for additional introduction by such a method as the present invention at distances greater than approximately twenty feet away from the excavation. The reason for this is twofold: acceleration of the remediation to reduce total project costs and the introduction of air passively through the sidewall of an excavation depends entirely on the flow rate of the groundwater system to carry oxygen downgradient. Groundwater systems are notoriously slow and removal of oxygen occurs along that flow path. Therefore, oxygen does not reach far from such an excavation.

U.S. Pat. No. 4,323,122, to Knopik, and U.S. Pat. Nos. 4,241,787 and 4,296,810, to Price, disclose methods for extracting organic liquid from groundwater by filtration of the organic liquid through a hydrophobic liquid permeable membrane. The organic liquid is pumped to the surface for disposal while the permeable membrane remains exposed to the water/organic liquid mixture. The problems with these and similar methods are that, while pumping increases the rate of extraction, pumping places stress on the permeable membrane, which rapidly breaks down, and produces extracted liquid contaminated by water. The extracted liquid must then be disposed of as hazardous waste or further treated to remove the water before the hydrocarbon product may be refined. This technology is known as "skimmer" pumps. Inasmuch as these need to be of reasonable size to be effective, the wells in which they are placed must be greatly oversized compared to the wells used in the present invention. The net result is a very expensive well system, and consequently few of these wells are emplaced on a remediation site. This fact means that they must be capable of extracting the free-product from a long distance. Additionally, the process produces water which must be pumped, treated and then disposed of at a per gallon disposal cost. This generates the need for a permit from the Environmental Protection Agency (EPA) which creates costs of about $2,000 per week simply for analyzing the disposed-of water. Additionally, high maintenance costs are incurred to keep the system from biofouling. The present invention does not use a free-product filter connected to any free-floating pumping facility and thus avoids biofouling. Secondly, the present invention operates in as small a well as one desires. The free-product filter of the present invention can be emplaced within the normal air-insertion wells of the present invention.

U.S. Pat. No. 4,872,994, to Jakob, discloses a method for separating gasoline from water within a water well by means of a floating, hydrophobic wick, the gasoline descending by gravity from the wick to a storage vessel for later extraction. The present invention does not employ such a wick.

U.S. Pat. No. 2,523,091, to Bruce, discloses an apparatus for separating oil from water within a well and separately extracting the two fluids. The apparatus does not permit extraction only of oil. The technology proposed by Bruce does not result in a contaminant free water. For this reason, water must also be treated on site as a hazardous waste thus vastly increasing the cost of the remediation technology. On the other hand, the technology proposed in this application leaves water in place for remediation. The present invention sends the free oil or gasoline or diesel to the surface in an approximately 98% pure product, thus allowing its transportation to refineries and not causing it to be treated as a hazardous waste with consequent costs.

U.S. Pat. No. 4,126,556, to Swanson, et al., discloses a method for separating immiscible liquids by siphoning. The method does not permit extraction of liquid mixed or partially mixed with water. The present invention does not use siphoning in any manner. It does remove an essentially pure organic liquid and leave the contaminated water in place for treatment. It thus does not require water treatment under hazardous waste conditions at the surface of the site and avoids the excessive costs of doing so.

U.S. Pat. No. 4,806,148, to Ottengraf, U.S. Pat. No. 3,216,905, to Baptist, U.S. Pat. No. 3,828,525, to Copa, et al., U.S. Pat. No. 4,662,900 to ottengzaf, and U.S. Pat. No. 4,723,9688, to Schippert, et al., disclose methods or apparatuses for purifying contaminated air by biological means and a semi-solid material such as compost or sludge which is termed a substrate. None disclose a method for decontamination of air using microbe-impregnated water rather than a semi-solid filter bed, or substrate. The above patents all deal with the relative advantages of various solid substrates within bioreactors. However, microbes do not need this substrate. The substrate itself is a very expensive addition to the treatment of waste gases by microbes. The current invention makes no use of substrate.

Despite the teachings of the prior art, there has not been previously available a method for in situ removal of organic and inorganic contaminants from groundwater in a subsurface aquifer, while leaving the treated water in place, as well as removal of such contaminants from the surrounding soil or vadose zone. Nor has there been available an integrated method for extraction of free-floating contaminants on the water table synchronously with the additional decontamination of soil residual vapor and contaminated ground water. There has also not been previously available an integrated method for isolating, fermenting, and reinjecting indigenous, desirable microbes for decomposing and volatilizing underground contaminants, nor injection via use of the same installed physical system used for other decontamination activities at the site. Nor has a method existed whereby air filtered through a contaminated zone is decontaminated by passage through microbe-impregnated water at ground level. The present invention results in an integrated system maximizing the benefits of both previous and new technologies in a manner which achieves a cost effective and rapid remediation unable to be achieved by the individual application of any previous patents or non-patented techniques.

Hydrocarbon contamination occurs in four types of contaminant form: vapors; free-floating product in liquid form; soil residual in liquid to semi-liquid form; and dissolved groundwater contamination. Not all four phases necessarily occur at each remediation site. Floating free-product does not occur without attendant soil residual contamination extending outward from the free-product plume. Soil residual contamination can, but seldom does, occur by itself. Contaminant vapors do not occur by themselves. They require the attendant presence of at least one of the following: contaminated groundwater, soil residual, and/or free-floating product. Contaminated groundwater is not known to occur without the presence of at least soil residual contamination. The presence of free floating product guarantees the contamination of groundwater which often extends outward a considerable distance from the location of the free-product. A remediation technology which has the capability of attacking only one type of contamination will not totally remediate the site. Despite the teachings of the prior art there has not been previously available an inexpensive system which attacks all four of types of contamination synchronously. The present invention attacks all four types of contamination, if present, synchronously. It attacks the four types of contamination in such a manner that there is no significant increase in costs for attacking either one or all four types of contamination.

Contamination at a hydrocarbon remediation site can occur in three separate geological conditions. It can occur solely in the soil column above the capillary fringe. It can and usually does occur in the soil column and the capillary fringe and it can and usually does occur in the soil column, the underlying capillary fringe and the underlying groundwater body below the water table. Despite the teaching of the prior art there has not been previously available a method for simultaneous attack on all three geologic conditions in which contamination is found. The present invention synchronously attacks all three geologic conditions where necessary. It does so without a significant increase in cost for attacking solely one of the geologic conditions.

The remediation of free-product and thus removal of continuous contamination of the site is enhanced by the use of the present invention. This results in remediation speedup at the site. Despite teachings of the prior art there has not been previously available a method for coupling the pumping removal of free-product with the removal efficiency of an additional technique, thus speeding up the entire remediation of the site.

Despite the teachings of the prior art, there has not been a method of integrating the remediation stress of single remediation technologies into a remediation stress which can be varied in intensity and type of stress. Contamination characteristics vary over a site and change with time as remediation occurs. Thus, a successful remediation technology requires it be varied in intensity and type of attack throughout the contamination over time. The present invention permits this by valving and by the application of its inherent parts. For example, in an old contamination, from which the volatiles have gone, little remediation takes place by vacuum, but the residual can be cleaned by bioremediation.

SUMMARY OF THE INVENTION (DISCLOSURE OF THE INVENTION)

The present invention comprises methods and apparatuses for remediation of subsurface contamination of soil and ground water.

A first method and system of the invention provides for in situ removal of contaminants from soil and from groundwater present in the soil in the form of a groundwater aquifer, there being a vadose soil zone existing down to a water table defining the upper boundary of the groundwater aquifer, comprising: establishing one or more injection wells extending through the vadose zone to a depth below the water table; establishing one or more extraction wells in the vadose zone extending to a depth above the water table; injecting oxygen-containing gas into the injection wells; and applying a vacuum to the extraction wells; whereby volatile contaminants in the groundwater aquifer and in the soil are removed through the extraction well and contaminants are volatilized, chemically degraded, and biodegraded.

In the preferred embodiment, one extraction well is drilled for each injection well. Each such pair, referred to as a "reactor nest," is deployed such that each injection well is within between three and 100 feet of at least one other injection well (if more than a single reactor nest is emplaced). Each injection well extends to a depth of one to 100 feet below the water table and each extraction well extends to a depth of one to 100 feet above the water table. Preferably, the oxygen-containing gas injected is heated (such as by solar heating). Extracted contaminants may be collected or vented. Manifolds are employed to vary the rates of air flow into the injection wells and out from the extraction wells.

A second method and system of the invention provides for in situ biodegradation of contaminants from soil and from groundwater, comprising: sampling the contaminants; determining the genera of microorganisms present in the samples; isolating genera known to be useful in biodegrading the contaminants; fermenting the isolated genera to increase populations of the useful genera; and inserting the fermented microorganisms into a subsurface contaminated zone. The fermented microorganisms may be inserted at the source of subsurface contamination, through air injection wells, or through air extraction wells. Nutrients known to support the useful genera may also be inserted into the subsurface contaminants (at the source of subsurface contamination or through air injection or extraction wells).

A third method and system of the invention provides for in situ extraction of subsurface contaminants, particularly free-product contaminants, comprising: an elongated tube reservoir capped at one end to be placed proximate the contaminants; entry ports in the elongated tube reservoir proximate the capped end; and a filtration cylinder surrounding the entry ports. Preferably, the filtration cylinder comprises a hydrophobic filter and a screen mesh. The elongated tube reservoir fills by subsurface fluid pressure.

A fourth method and system of the invention provides for biodegradation of volatile contaminants in air, which air has been passed through a subsurface region contaminated by the contaminant, comprising: one or more containers; means for filling the containers with water and microorganisms useful in biodegradation of the contaminant; hosing and apertures providing the contaminated air to the water within the containers such that the air must pass through each container; and hosing and apertures permitting the air to escape each container after passage through the water therein. Preferably, each container contains a diffuser through which the air is supplied to the water and a baffle within the container around or through which the air must pass. The containers are preferably simple 55-gallon drums.

Each of the above systems of the invention may be used, as required by the contamination on site and changes therein over time, to remediate contamination. The systems may be used alone, or in conjunction with one another in all possible permutations thereof.

Accordingly, the object and purpose of the present invention is to provide an improved method and associated system for removing contaminants from subsurface soil.

Another object of the present invention is to remove contaminants from a subsurface aquifer.

An additional object of the present invention is to provide a method and system of removal of contaminants from subsurface soil as well as from groundwater.

Another object and purpose of the present invention is to provide a relatively inexpensive method and system for in situ removal of contaminants from subsurface groundwater and soil.

An additional object of the present invention is to provide for extraction of free hydrocarbon product from contaminated subsurface groundwater that is pure enough to be refined rather than handled as a toxic waste.

Yet another object of the present invention is to bioremediate air which has been circulated through contaminated soil and groundwater before venting of the air to the atmosphere.

A primary advantage of the present invention is that it is relatively inexpensive, efficient, and quick because of the combination of technologies employed.

An additional advantage of the present invention is that it integrates simultaneous remediation of free-product, soil residual, vapors, and contaminated groundwater. These processes take place in the vadose zone, capillary fringe between the vadose zone and the water, at the water table, and below the water table, synchronously. It does so by synchronous attack upon each of the physical and chemical characteristics of the four types of contamination.

Yet another advantage of the present invention is that contaminated air may either be vented or treated before venting.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

Figure 1:
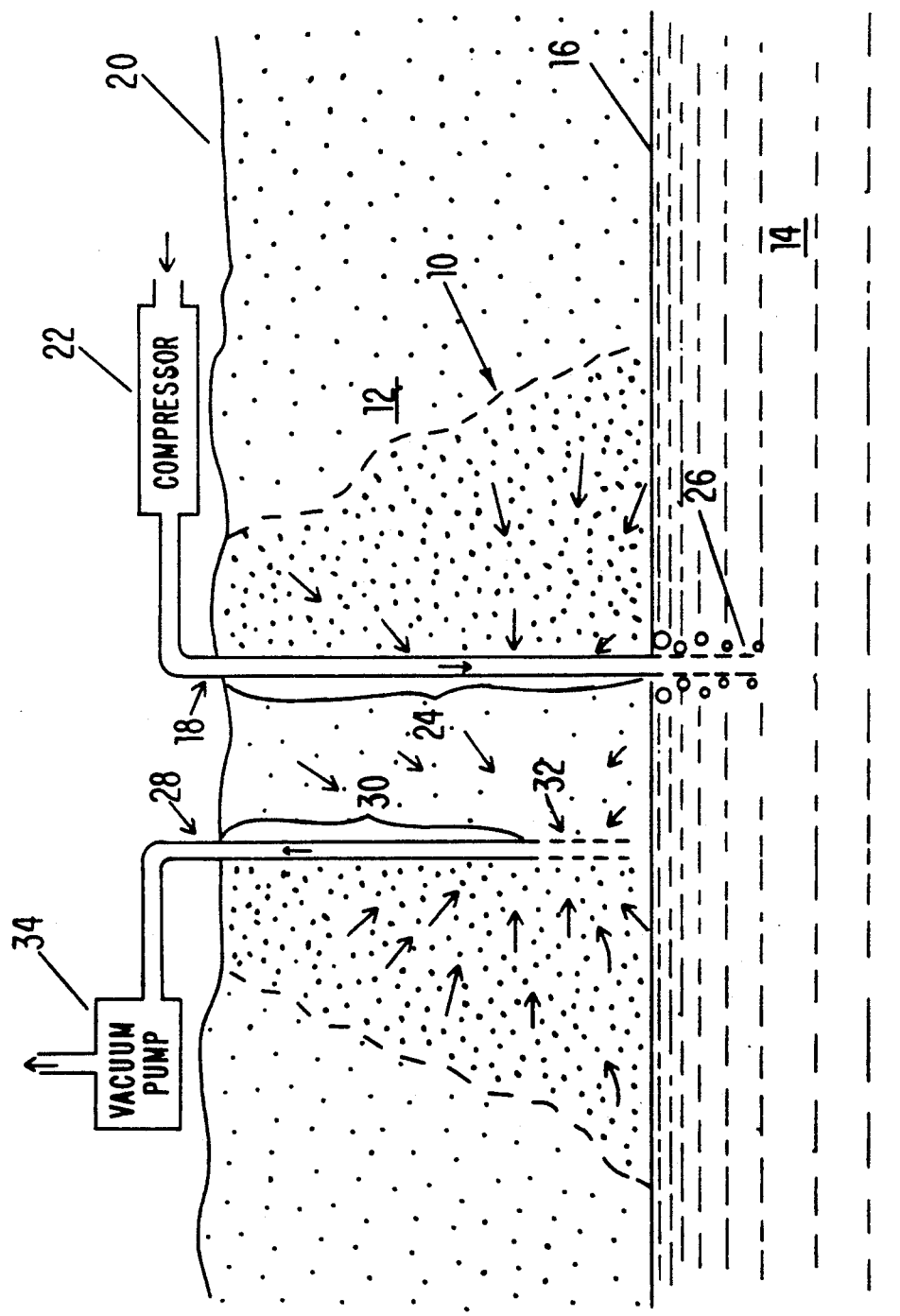
FIG. 1 is a schematic illustration in cross-section of a subterranean soil formation having a water table, and wherein the method and system of the present invention are being applied.

DESCRIPTION OF THE PREFERRED EMBODIMENTS (BEST MODES FOR CARRYING OUT THE INVENTION)

The present invention relates to methods and apparatuses for remediating, biodegrading, and extracting organic and inorganic contaminants from subsurface soil and groundwater. In the preferred embodiment, no excavation activity is necessary, no liquid need be pumped below or above ground, no fluid need be recirculated, and no special fill material need be placed along the length of a bore hole. In the preferred embodiment no liquid need be pumped to the surface, no liquid treatment facility need be placed on the site, and no disposal facility for treated liquid need be placed on the site. No transfer of contaminants from the site location to another location occurs and the treatment technology degrades the contaminants to a non-contaminant condition. All of these non-occurrences result in major reduction in costs at the site.

This invention is an integrated delivery system to effectuate the advantageous characteristics of, primarily, bioremediation. This is because bioremediation causes 70% to 80% of the remediation success on a hydrocarbon contaminated site. For cost reasons, a delivery system must be capable of injecting air or other vapors capable of supplying oxygen for the enhanced bioremediation as well as nutrients for enhanced bioremediation. The same physical delivery system for injected air is used to gain the advantage of air stripping aspects of remediation. However, injection of air leads to relatively uncontrolled distribution of vapors moving up from below the water table through the vadose zone and possibly to exit points that were unsatisfactory to the populations living above the pollution. Therefore, a vacuum portion of the system controls the distribution of the vapor phase. The purpose is not primarily to remove volatiles by vacuum, but to control the entire vapor movement system containing portions of contamination and biological byproducts such as $CO_2$ and biologically formed volatile hydrocarbons. The system of the invention is therefore, an integrated system capable of placing maximum remediation stress at selected portions within the contaminated plumes.

Because the initial contamination may be free-product, i.e., liquid which would flow to a well underground, the present invention includes a free-product recovery system that can be placed within the present invention so that free-product may be removed early on the remediation. The free-product system has demonstrated, in tests, excellent removal of a 98% pure, liquid contaminant, such as gasoline. The advantage of relatively pure liquid being taken from the contaminated site is that it does not have to be transported to a hazardous waste treatment facility and can simply be returned to the incoming stream of supply of a refinery. It can be re-refined, thus conserving energy and producing a profit to the refiner. If the free-product is collected in an impure manner, as with the prior art, it requires handling as a hazardous waste. The handling of any material as a hazardous waste is an exceedingly expensive process. A secondary cost reduction to the remediation occurs because the free-product invention may be inserted in the vacuum wells of the current invention and initiated at the same time as other remediation efforts. Again the cost reduction occurs because any reduction in overall project life reduces the cost significantly.

The distribution around and within contaminated sites of hydrocarbon digesting microbes is inconsistent. This means that bioremediation may take place on portions of the site at a high level because of the presence and activity of hydrocarbon digesting microbes, but in other parts of the site these microbes may be absent and therefore bioremediation is reduced in effect. The present invention provides for the collection of microbes at the site during the installation of the systems of the invention. These samples of microbes are then selected and the microbes which conduct the remediation at the site are isolated. After isolation, the microbes are enhanced in terms of total numbers in the population relative to non-useful bacteria. The improved sample of indigenous microbes is then reinjected at the site in the correct location where it is required, the net result being an increase in remediation towards the final desirable results. All sampling and reinoculation takes place from wells normally installed, thus effecting further cost control. The invention also consists of artificially feeding the contaminant-reducing microbes an additional food source in order to maintain high populations during the period of remediation when that is necessary. The artificial food source is a mix of naturally occurring and completely biodegradable non-contaminating organic compounds.

The present invention also includes a treatment system for the stack gases at the end of the current invention, to any desired level of treatment. Stack gases are passed through one or more containers containing water and microbes known to attack the contaminant. The microbes may have been extracted from the subsurface and fermented or received from another source.

In essence, the present invention comprises creating throughout the area of contamination, regardless of type of contamination, a set of reactor cells in situ. These reactor cells are placed in the groundwater below the water table and above the ground water. These reactor cells remediate by the process of vapor removal, the process of in situ air stripping, and, most importantly, by initiating and continuously supporting in situ bioremediation. The primary purpose of the reactor cells, their delivery systems, and delivery of sustaining material, is to enhance the natural potential of indigenous microbial bioremediation. The current invention is thus an integrated system maximizing the use of several remediation technologies which are inadequate of themselves to consistently remediate the total contaminated volume.

The four types of contamination are vapor, liquid contaminant, dissolved contaminant, and non-flowing, soils residual liquid (or semi-liquid) contaminant. The integrated system of the current patent application actively and synchronously remediates all four types of contamination, which is not possible in the prior art.

Before a contaminated site can be remediated with the prior art, it is necessary to conduct a series of assessment evaluations. These assessment evaluations generally cost in the range of $50,000 to $300,000 per site, and accomplish no remediation in and of themselves. The present invention requires minimal to no previous assessment. The site is assessed dynamically by the installation of the remediation system and the remediation system is modified and designed as the assessment information comes in from the drilling for the remediation system.

Hydrocarbons can be broken down and degraded by anaerobic microbes. However, the most successful degradation and the most rapid degradation occurs by aerobic microbes. For this reason, the delivery of oxygen to the microbial environment is a necessity at remediation sites. For example, a common contaminant, diesel fuel (or diesel), is to a large extent nonremediable by simple extraction of volatiles. This is the result of the fact that diesel contains a very low concentration of volatiles. However, diesel serves as an excellent food source for a microbial population, providing that oxygen can be supplied. Diesel dissolves at such a slow rate that "pump and treat" technologies have essentially no chance of succeeding in remediating a diesel contaminated site. The technology of pure vacuum extraction also tends to fail on diesel sites because of the low volatility of the diesel components. Therefore, the most important remediation technique with respect to diesel is bioremediation.

With respect to the other major contaminant of leaking hydrocarbons, i.e., gasoline, it too is dominated by compounds of low volatility. This means that physical removal is also a relatively minor part of gasoline remediation. Gasoline can be remediated strictly with physical means such as vacuum and air stripping, but the rate is excessively slow and therefore the cost of that technology is excessively high in most cases. The present invention differs from those technologies of pure physical methods by enhancing bioremediation.

Physical removal of contaminants in the present invention is accomplished by two processes. A high vacuum but low flow pump creates a negative pressure in the subsurface, forcing movement of contaminants to the vacuum pump as well as increasing volatilization of liquid contaminants to vapor. A major reason for using a low flow pump is to allow the system to operate in most instances without the need for extensive and expensive stack gas treatment equipment. By being patient with the flow of contaminated atmosphere, the present invention also increases the rate of contact for bioremediation rather than exhausting the contamination to a new environment. Preferably, in addition, oxygen is introduced by a compressor or other suitable air flow pump and air injection wells. The air injection and vacuum extraction wells are preferably drilled in pairs, relatively close to one another but separated various distances from additional pairs (three to 100 feet), based on site conditions.

In addition to enhancing and supporting the indigenous microbial population, microorganisms that feed on the targeted contaminant are extracted from subsurface samples, fermented, and reintroduced to the subsurface at heightened concentrations, where useful. Free liquid contaminant below the water table is extracted, in a form free of water, using only existing subsurface liquid pressures. Air containing volatile contaminant may be treated at the outlet of the vacuum pump by means of a series of containers filled with water and microorganisms known to biodegrade the volatile contaminant. These microorganisms may be the same as those fermented and reintroduced to the subsurface.

The characteristics of the contamination plumes of the four types of contamination do, in fact, change over time as remediation progresses. For example, the free-product plume may spread out and disappear, increasing the extent of the soil residual plume; the expansion over time of the groundwater contaminant plume due to flow of the groundwater creates an expansion of the overlying vapor contaminant plume; the use of a high volume vacuum extraction system will dry out the vadose zone resulting in cracking and flow of vapors through those cracks, which results in a less effective remediation system with the passage of time; and the expansion of the microbial population to new areas due to the introduction of life-supporting oxygen, creating a different remediation rate in effect in different parts of the plume over time. A single remediation technology which depends on a single process, such as vacuum extraction, is incapable of responding to the changes in the conditions of the contaminant plume. For example, the singular application of vacuum extraction has little effect on groundwater contamination because of the controlling effect of slow diffusion. These conditions further mean that to achieve total remediation in the least amount of time and at the least cost requires that the beneficial processes of several types of remediation need to be applied in an integrated fashion at the contamination site. Furthermore, the installation of the physical apparatus needs to be capable of variation and intensity vis-à-vis the relative types of remediation stress over time on the contamination plume, without significant additional costs. This is achieved in the present invention by valving and manifolding so that the degree of vacuum stress, of air stripping stress, of oxygen supply, of flow velocities of the vapor phase, and of the distribution of microbial populations capable of attacking the pollution, are all variable based on the response of the plume. This is why, by design, the present invention can in fact respond to plume changes over time and thus accelerate the rate of remediation. Inasmuch as the existing art is using the concept of singular types of remediation stress, such as pure vacuum, the result has been a less than satisfactory remediation rate and a significantly less than satisfactory cost of remediation.

By the addition of methods and apparatuses to the basic design of the present invention, ancillary problems associated with remediation are handled as part of the present invention itself. The presence of free-product is most expeditiously handled by removing liquid free-product as a relatively pure liquid, free of water. The problem of the free-product being a hazardous waste is most expeditiously handled by the use of the free-product extraction method and apparatus of the invention so that the product being removed is sufficiently pure it does not create a hazardous waste. The problem of unequal distribution of the original microbial populations capable of digesting and remediating the hydrocarbon is handled by the process of the present invention of extracting, fermenting, and reintroducing microbes. The problem of the decrease in rate of remediation as the hydrocarbon food source is destroyed, resulting in decreasing microbial populations is handled by the process of the present invention of inserting air and food to the contaminated zone. The problem of excessive organic vapors from the vacuum venting stack is handled, when necessary, by the addition of a low-cost microbial treatment system of the present invention. Thus, the present invention provides a "cradle to grave" integrated system. The result, as demonstrated by the examples of existing sites which have used this technology, is a more rapid and therefore a more cost-effective remediation program.

Figure 2:
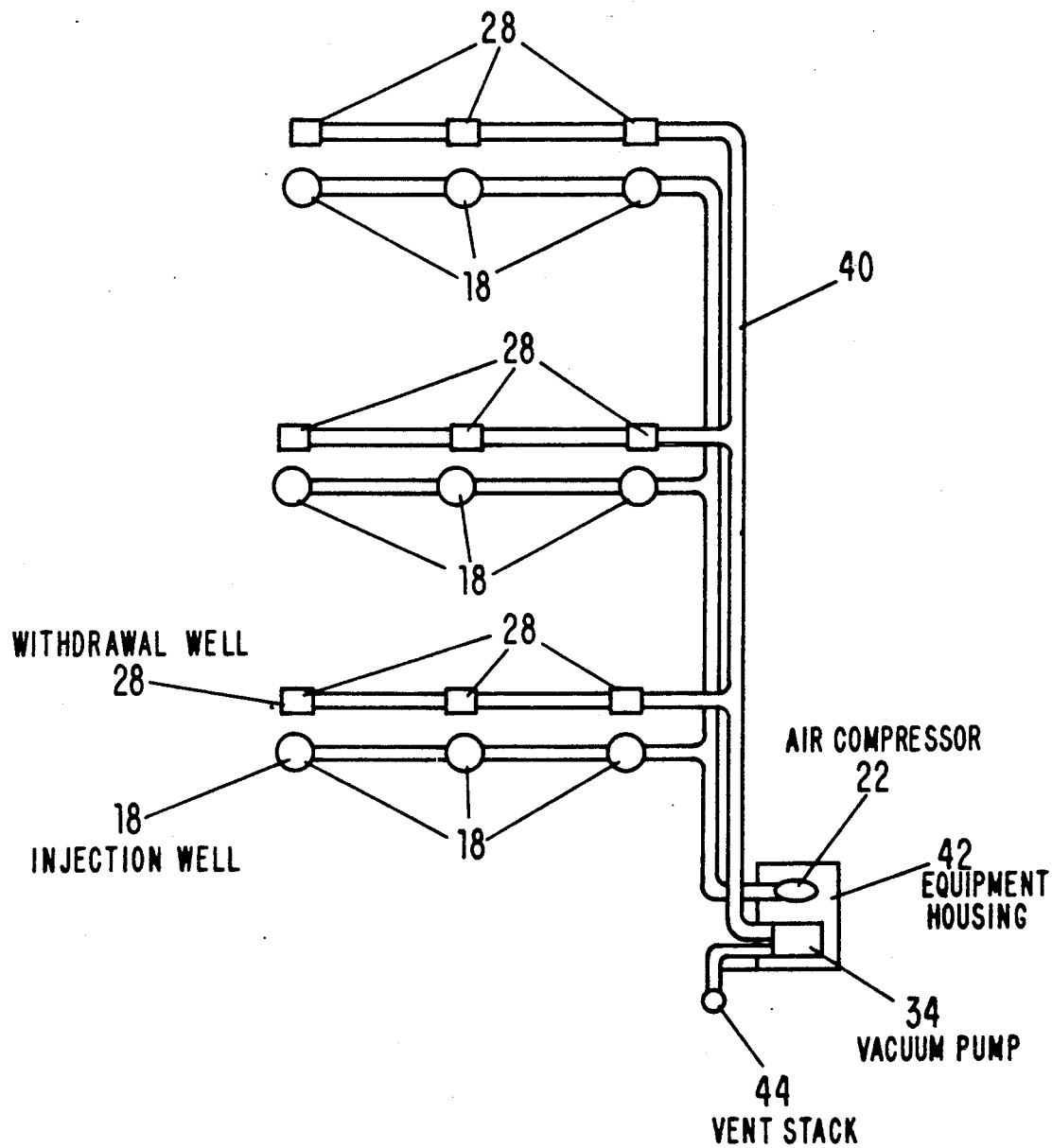
FIG. 2 is a plan view of an array of wells connected to a single compressor/vacuum pump station.

Referring to FIGS. 1 and 2, the methods of the present invention are directed to the remediation of a contaminated site 10, wherein there is a vadose zone 12 overlying a groundwater reservoir or aquifer 14. The contamination will be present in the groundwater reservoir or aquifer 14 and in the vadose zone 12. The upper boundary of the aquifer 14 is defined by the level of the water table 16. It will be recognized that there may be a capillary zone (not shown) above the water table 16, in which water is drawn upwardly into the vadose zone 12 by capillary action. The capillary zone will be contaminated if the groundwater itself is contaminated.

In the preferred embodiment, injection wells 18 extend from the ground surface 20 to a level beneath the water table 16. The injection wells 18 are connected to an air compressor 22. The air compressor 22 preferably has a capacity of at least approximately 10 to 300 cubic feet per minute (cfm) at 1 to 100 pounds per square inch (psi). Air or other oxygen-containing gas is introduced into the injection well 18 via the air compressor 22. The term "air," as used throughout the specification is intended to include oxygen-containing gases.

An injection well comprises common materials such as polyvinyl chloride (PVC). Injection wells are completed and emplaced using common methodology. The injection wells 18 preferably include a gas-impermeable well liner 24, such as a PVC pipe, along the major part of its length. The injection well 18 extends to a depth of preferably one to 100 feet beneath the water table 16. The depth of penetration below the water table depends on the thickness of the contaminated portion of the groundwater aquifer. Air, or other gaseous oxygen supply, exits the injection well through a screen, of a common manufactured type, into the aquifer at the chosen depth.

The lower end of an injection well 18 contains openings, such as from a gravel-packed, 10–40 slot screen 26 or piping with holes in it. The screen 26 functions as a sparger to introduce pressurized air into the aquifer 14, so as to stimulate circulation of the water and mixture of the air and water. Injection is accomplished at low to moderate air pressure.

Extraction wells 28 are located in the soil 12 adjacent to injection wells 18. The relative distance in both the horizontal and vertical dimensions between injection well and extraction well is critical to proper operation of the present patent application system. These distances are chosen based on site characteristics. The extraction well 28 includes a gas-impermeable pipe 30 along the major portion of its length. The lower end of the extraction well 28 contains openings, such as a sparger from a gravel packed, 10–40 slot aperture size well screen 32 or piping with holes in it. The bottom of the extraction well 28 is preferably located at a depth of approximately one to 100 feet above the water table 16, based on site conditions. The actual distance above the water table depends on characteristics of the capillary zone contamination and the soil residual contamination.

The extraction well 28 is connected to a vacuum pump 34. The vacuum pump 34 is preferably of a capacity of at least 10 to 300 cfm. The degree of vacuum exerted on the system depends on the design characteristics, such as spacing of reactor nests, and on geologic characteristics such as permeability. The vacuum pump 34 draws the volatile contaminants into the extraction well 28. The arrows shown in FIG. 1 illustrate the path of travel of volatile contaminants into the extraction well 28.

Figure 36:
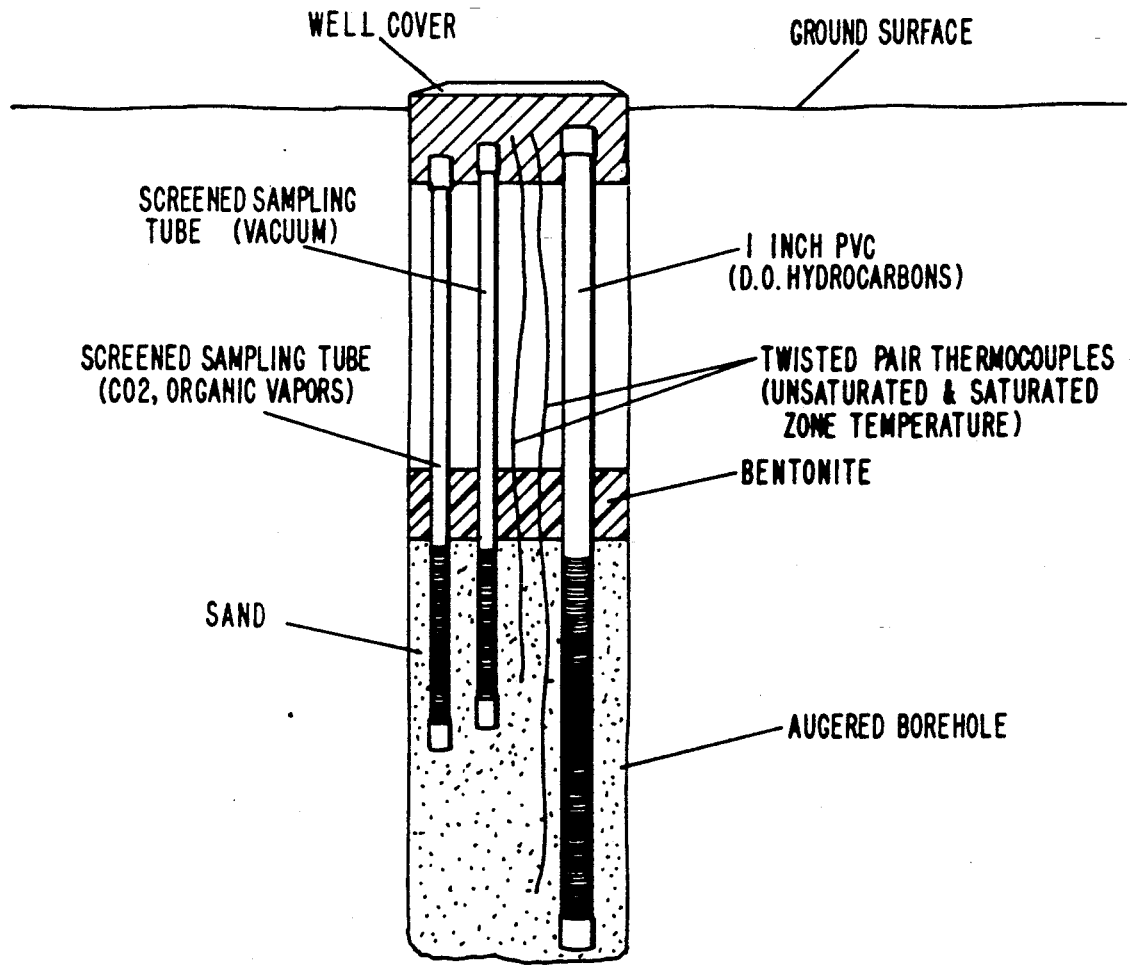
FIG. 36 is an illustration of a monitoring well of the invention.

FIG. 2 illustrates an array of injection wells 18 and associated extraction wells 28, all connected by piping 40 to a common compressor 22, a vacuum pump 34, and assembly 42 with venting through a vent stack 44. The piping 40 and well heads may be positioned above the ground surface 20 or may be disposed just beneath the ground surface 20, in areas where access is necessary (e.g., roadways or gas stations). Each pair of an injection well and extraction well is referred to as a "reactor nest." As illustrated in FIG. 36, the injection and extraction wells may be physically located in the same bore hole, which bore hole may also contain a testing or monitoring well.

The gas-impermeable piping 24 and 30 of the injection and extraction wells 18 and 28 and screen materials may consist of metal or plastic piping, such as one- to two-inch PVC piping. The annulus (opening between borehole and pipe) is sealed above the screens (e.g., with a bentonite/cement mixture) to prevent suction loss and migration of surface water to the subsurface. These are common well-development proceedings.

Examples of actual sites in which the present invention is or may be operating are shown in FIGS. 13 to 32. Review of the horizontal spacing layout of the reactor nests on each of these examples will make it obvious that the horizontal geometry of the interconnected reactor nests of the present invention are highly site dependent. Consideration must be given to approximately forty different physical and chemical variables at the site in order to provide a design that will result in the lowest cost and most rapid remediation. The factors which are considered with respect to the design and the spacing of reactor nests and the separation between the vacuum portion of the physical system and the air injection of the physical system are as follows:

1. Vertical dimensions of soil and water contamination (free-product, residual, dissolved, soil-gas).
2. Horizontal dimensions of soil and water contamination (free-product, residual, dissolved, soil-gas).
3. Stratigraphy.
4. Probable vacuum field.
5. Probable pressure field.
6. Probable thermal field.
7. Dissolved oxygen field
8. Three-dimensional concentration distribution.
9. Soil type.
10. Soil contaminant chemistry.
11. Soil organic matter.
12. Water contaminant chemistry.
13. Type of product.
14. In situ microbial characteristics.
15. Volume of release.
16. Special client needs.
17. Property boundaries.
18. Off-site land use.
19. Off-site risks.
20. Third party liabilities.
21. Age of contamination.
22. Agency needs.
23. Monitor needs.
24. Number and location of sources.
25. Intermingled plumes.
26. Multiple releases.
27. Product chemicals and their physical, chemical nature.
28. Henry's Law.
29. Vapor pressures.
30. Solubilities.
31. Treatabilities.
32. Air emission requirements.
33. Diffusion.
34. Dispersion.
35. Bubble physics.
36. Well completion needs.
37. Permeabilities.
38. Porosity.
39. Power cost alternatives.
40. Valving alternatives.
41. Ideal Gas Law.
42. Raolt's Law.

As stated earlier, to achieve maximum cost-effective remediation, one must vary the stress characteristics of the different types of remediation being integrated over time as remediation proceeds. In order to do this, one must measure several critical variables, relate these in empirical formulas, and use the results of this empirical analysis to change such factors as the ratio between vacuum and air, the rate of air injection, the application of vacuum and air injection by temporary stops or pulses, and the use or microbe insertion or growth stimulation. For example, the use of air injection will result in an increase in the dissolved oxygen of the contaminated groundwater. This effect is negated by use of the oxygen in the hydrocarbons to cause bioremediation. Therefore, an increase in the dissolved oxygen content within the plume indicates that the amount of oxygen being supplied is sufficient to serve the needs of the bioremediation of the microbial population. If this is not accompanied by a decrease in the hydrocarbon contamination, which should be being eaten, this means the microbial population is of the wrong mix of genera and/or is underpopulated. This observation results in the demonstration of the need for microbe insertion in that particular area of the contamination plume.

As a further example, stack vent gases are measured to determine what portions of the remediation stresses are being effective. For example, as microbial activity starts, the percentage of $CO_2$ in the stack gases increases. As volatilization, that is vacuum and air stripping of the remediation stress decreases, the hydrocarbon vent gases decrease in concentration. If the system is still operating at maximum efficiency, the $CO_2$ percentage of the stack gas will remain high while the hydrocarbon portion decreases. When the hydrocarbon portion of the stack gas has decreased to its minimum and this is coupled with a decrease in percent $CO_2$ in the stack gas, this indicates a decrease in the total remediation at the site. If this is coupled with decrease in the groundwater contamination, with the contamination still above statutory limits, the measurements indicate the need for the application of microbial growth stimulation.

Because the design inherently includes valves and manifolding allowing stack gas extraction from individual portions of the contaminant plume, one may evaluate each portion separately and determine whether or not remediation has been successful or needs to be accelerated by application of modified stresses. If a portion of the plume has already reached the point of cleanup, an occasion which is by no means rare, but other portions of the contaminated plume still need remediation, one may close off the clean area simply by adjusting valves and transfer all the remediation stress to a portion of the plume that still needs additional clean-up. It should be pointed out that this high degree of manipulation stress is inherent in the present invention, but is lacking in all singular applications of previous technology such as pure vacuum extraction and "pump and treat" technology. Thus, the present invention, specifically because it is an integrated system, has the capability of modifying significantly the rate and cost of remediation which cannot occur within the previous art.

Figure 3:
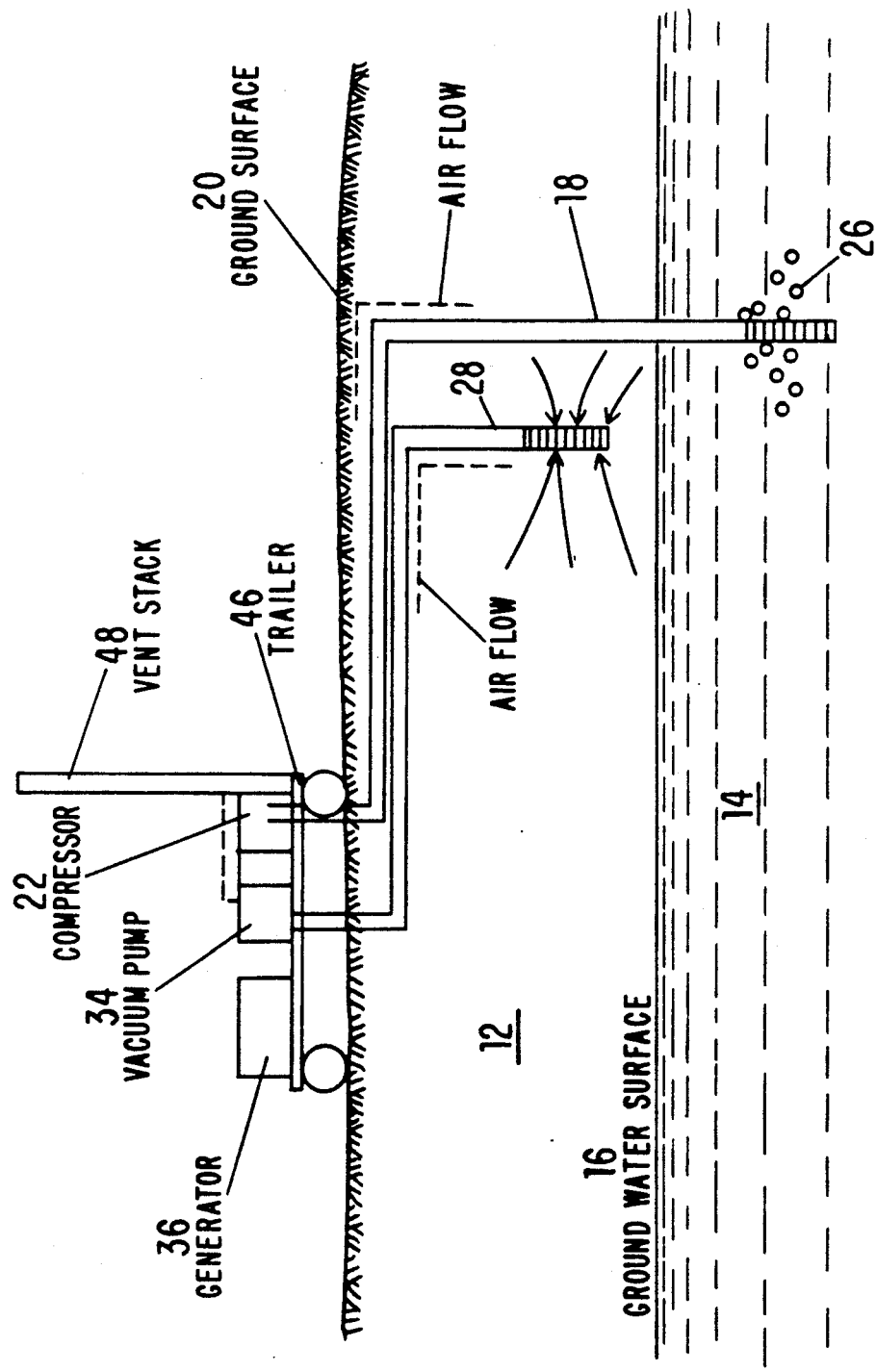
FIG. 3 is a side view of a portable system of the present invention.

In an alternative embodiment, shown in FIG. 3, the compressor 22 and vacuum pump 34 with an associated generator 36 are mounted on a vehicle or portable trailer 46. The trailer 46 may also have a vent such as a vent stack 48. The piping to the injections well(s) and extraction well(s) could be flexible for ease in assembly and disassembly. A number of remediation sites are identified shortly after the release of contaminant to the subsurface. It is well known in the art that if remediation occurs as rapidly as possible on such "live" sites, the maximum extent of contamination is never achieved and therefore the maximum cost of remediation is not achieved. This indicates the need for rapid response by portable remediation means that can be emplaced and made active while assessment of the site is occurring. The net result of coupling assessment and remediation into one portable system on such "live" sites is that the total cost of remediation for that site is going to be significantly decreased, compared to the cost if one waits until assessment is completed and remediation design is completed, and permanent installations are in place. By use of a portable system, in sealed receptacles, excavated material may also be remediated.

Figures 4, 5, 6:
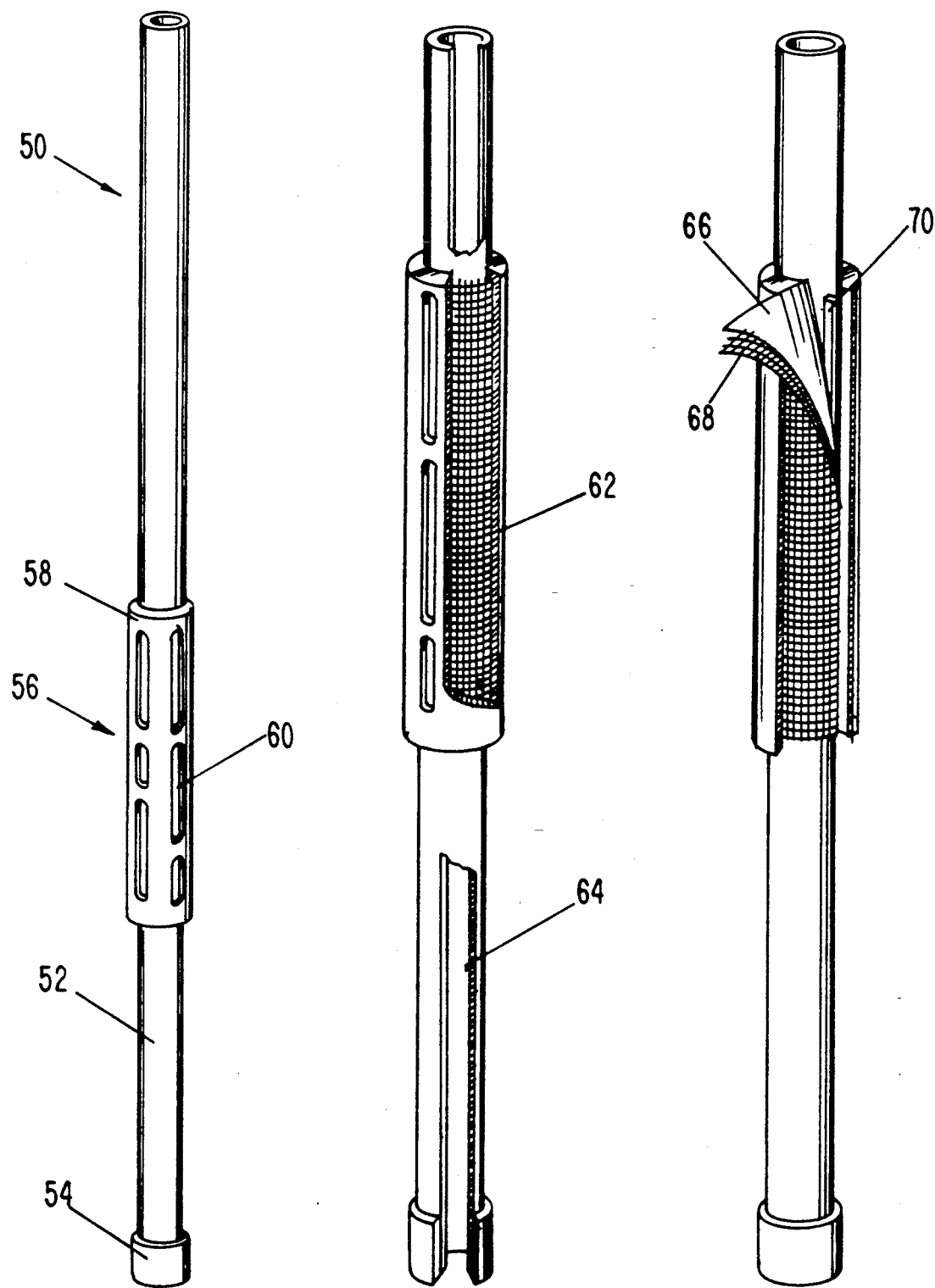
FIG. 4 is an exterior view of the free-product extraction apparatus of the invention.
FIG. 5 is an interior exposed view of the free-product extraction apparatus.
FIG. 6 is a further interior exposed view of the free-product extraction apparatus.

Heated air is preferably injected into subsurface contaminated zones to facilitate bioremediation. The advantage of heating the contaminant plume, whether in the vadose zone or in groundwater, is partially an increase in the concentration of volatile compounds but primarily in the increase in the bioremediation aspect of the present invention. Heating may be accomplished by a variety of common means including induction heating and solar heating. The process of heating is particularly important in northern climatic conditions. Because of its inherent distribution of reactor cells and its physical use of injection wells, the present invention easily facilitates assisting remediation by increasing temperature of the water and soil. This is another example of synergistic improvement due the inherent design features of the present invention as an integrated system.

Where a liquid contaminant is known to be present as free-product within the groundwater 14 (or in the soil above the water table), the following method of separation and extraction is employed. FIG. 4 illustrates the preferred method and apparatus for free-product extraction. A free-product extractor 50 is inserted in an extended withdrawal well 28. The extractor 50 comprises a hollow reservoir 52, and end cap 54, and an entry cartridge 56. The entry cartridge 56 comprises a protector 58, outer ports 60, and a filtration screen 62. The filtration screen 62 comprises an outer layer 68 and a hydrophobic filter 66. The entry cartridge 56 covers inner ports 70 permitting passage of fluid contaminants to the hollow interior 64 of the reservoir 62.

Liquid contaminant is separated from groundwater 14 (or extracted from soil above the water table) by placing entry cartridge 56 in contact with the contaminant/water mixture (or contaminant/soil mixture) found at the bottom of an extended extraction well 18. Where a plurality of insertion wells 18 are employed, a free-product extraction apparatus 50 is preferably placed in each extended well to speed collection of free-product. The contaminant/water mixture contacts filtration screen 62 through outer ports 60. Subsurface fluid pressures force liquid contaminant through filtration screen 62 into the interior 64. However, water does not enter interior 64 because it cannot pass through hydrophobic filter 66. Subsurface fluid pressures, and not pumping pressures, force fluid contaminant to gradually fill reservoir 52. The reservoir 52 then is pumped and allowed to refill before further pumping. This under-pumping allows the well to retain maximum efficiency.

The benefits of this free-product removal are three fold. First, because extraction of water is unnecessary, the water need not be treated and then reintroduced into the subsurface aquifer nor otherwise disposed of. Second, because no pumping of product occurs while the filter is exposed to the water/product mixture, the filter and filter performance do not degrade rapidly. Third, the product extracted is hydrocarbon product to be processed by a refinery rather than treated as hazardous waste, helping to offset the cost of the subsurface remediation process and also, allowing the well to maintain maximum efficiency.

This method is not necessary at a site where there is no free-product. Furthermore the amount of free-product and its distribution at the site affect the costs of its collection. If the amount is small, the free-product extractor is unwarranted. If free-product is more than approximately an inch thick, an extractor should be employed. Should the site costs related to the extractor require a reduction of the number of times a well is visited for pump out of the free-product, an alternative embodiment of the extractor will successfully overcome that additional cost. The alternative is to overdrill the initial well, attach to the bottom of the extractor a blank piece of pipe with a cap on the bottom. The blank pipe is inserted into the overdrilled well prior to setting the extractor filter at the free-product level whereby a reservoir is created which is allowed to fill and is pumped periodically. This can, at sites where necessary, result in cost reductions.

In the preferred embodiment, the following method is employed to extract, analyze, ferment, and reintroduce microorganisms useful in biodegradation of contaminants. Samples are taken from several contaminated zones (and, at times, from non-contaminated zones) within the site, because microbes are not uniformly distributed within a site. The samples are examined to determine the genera of microbes present and their concentrations. Microbes known or demonstrated to be useful in biodegrading the contaminant at the site are isolated and fermented to increase population. The site is then inoculated with the heightened population either through the point of contamination or through one or more injection wells 18 or extraction wells 28.

As the concentration of contaminant decreases, the concentration of contaminant degrading microbes must also decrease. If the rate of the microbial decrease is sufficient that it becomes apparent that the site will not reach statutory limits in a rapid fashion, the preferred embodiment employs the following growth-stimulation method. Using this approach, food supplies are inserted into the site using the same physical distribution of wells as is used for other aspects of this integrated remediation system. This results in a very cost effective enhancement of the rate of bioremediation without requiring any additional physical apparatus. This process takes place primarily in injection wells 18. However, if the vadose zone 12 is exceptionally dry, humidity enhancement and nutrient enhancement take place in the extraction wells 28.

The outlet of the vacuum pump 34 may be connected to suitable stacks, vents, scrubbers, condensers, chemical filters and/or scavengers (not shown), to collect, dilute or vent contaminants extracted from the soil and groundwater. The preferred embodiment uses flow rates in the vacuum and air injection system which allow maximum bioremediation of the vapors so that air quality standards are not exceeded by the fluids vented by the remediation unit. However, some site conditions are such that one must extract at a heavier or faster rate, thus potentially causing exceeding of air quality standards. Normally the present invention is operated in such a fashion that post-treatment of extracted gases is not necessary. However, the present invention provides a post-treatment method which, if necessary on the site, is very cost-effective and requires no electrical power. An example of other useful filters are activated carbon filters, biotreaters, treatment by incineration, catalytic oxidation, or ultraviolet rays. These latter techniques are considerably more expensive than is the present invention.

Figure 9:
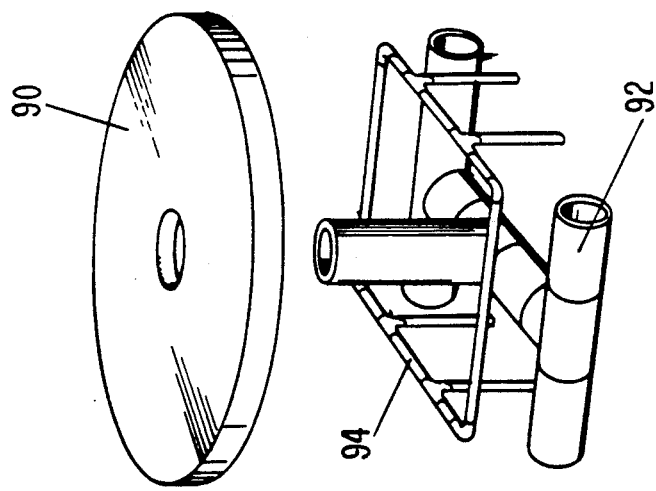
FIG. 9 is an illustration of interbasal components of the biotreater apparatus.
Figure 8:
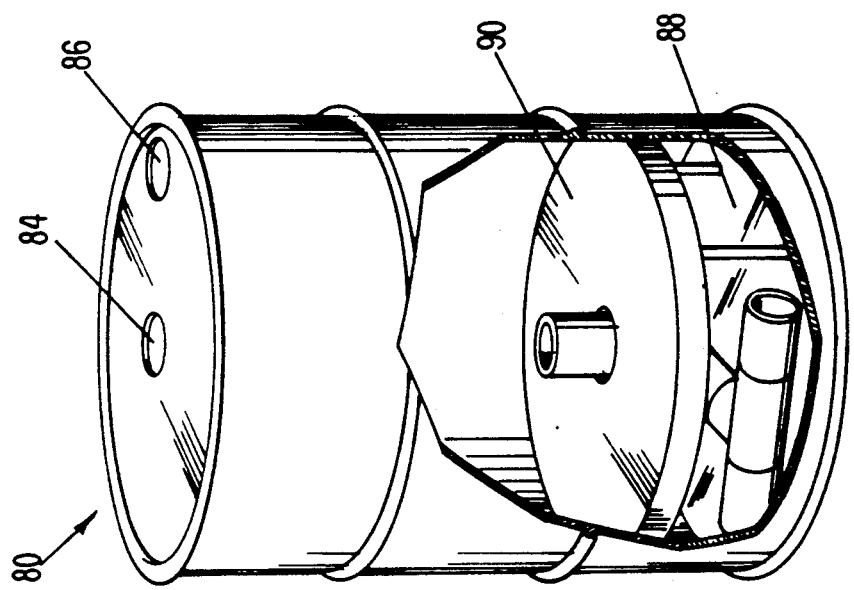
FIG. 8 is an interior exposed view of the biotreater apparatus.
Figure 7:
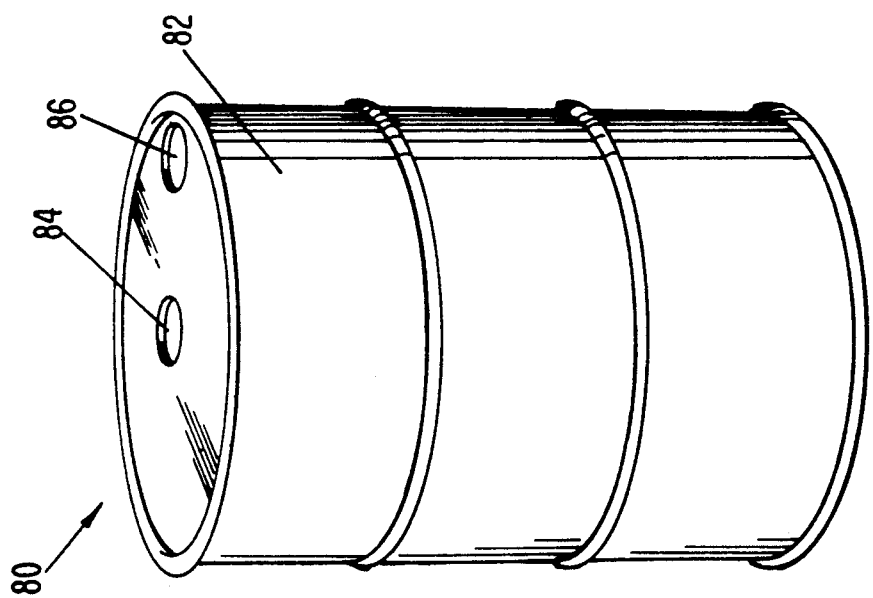
FIG. 7 is an exterior view of the bioreactor apparatus of the invention.

The preferred biotreater 80 illustrated in FIGS. 7 through 9 is employed at the outlet of the vacuum pump 34. An air conductive pathway (not shown) is established between vacuum pump 34 and diffuser 92, passing through inlet 84 into container 82, preferably a 55-gallon drum. The biotreater 80 is filled with water impregnated with microbes determined to have a degrading effect on the contaminant being extracted. When the vacuum pump 34 is in operation, contaminated air passes into biotreater 80, bubbles up through the microbe-impregnated water from diffuser 92, past baffle 90 supported by stand 94, and out through outlet 86.

A plurality of biotreaters 80 may be connected in series to more efficiently decontaminate the air extracted by vacuum pump 34. Biotreaters may be added or deleted from the series as contaminant concentration from the vacuum pump 34 increases or decreases. Preferably, the microorganisms placed within the biotreaters are fermented from subsurface samples, and hence are identical to the microorganisms reintroduced to the subsurface at heightened concentration.

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all applications, patents, and publications cited above, and of the corresponding application are hereby incorporated by reference.

EXAMPLES (INDUSTRIAL APPLICABILITY)

The invention is further illustrated by the following non-limiting examples.

EXAMPLE 1

Figure 10:
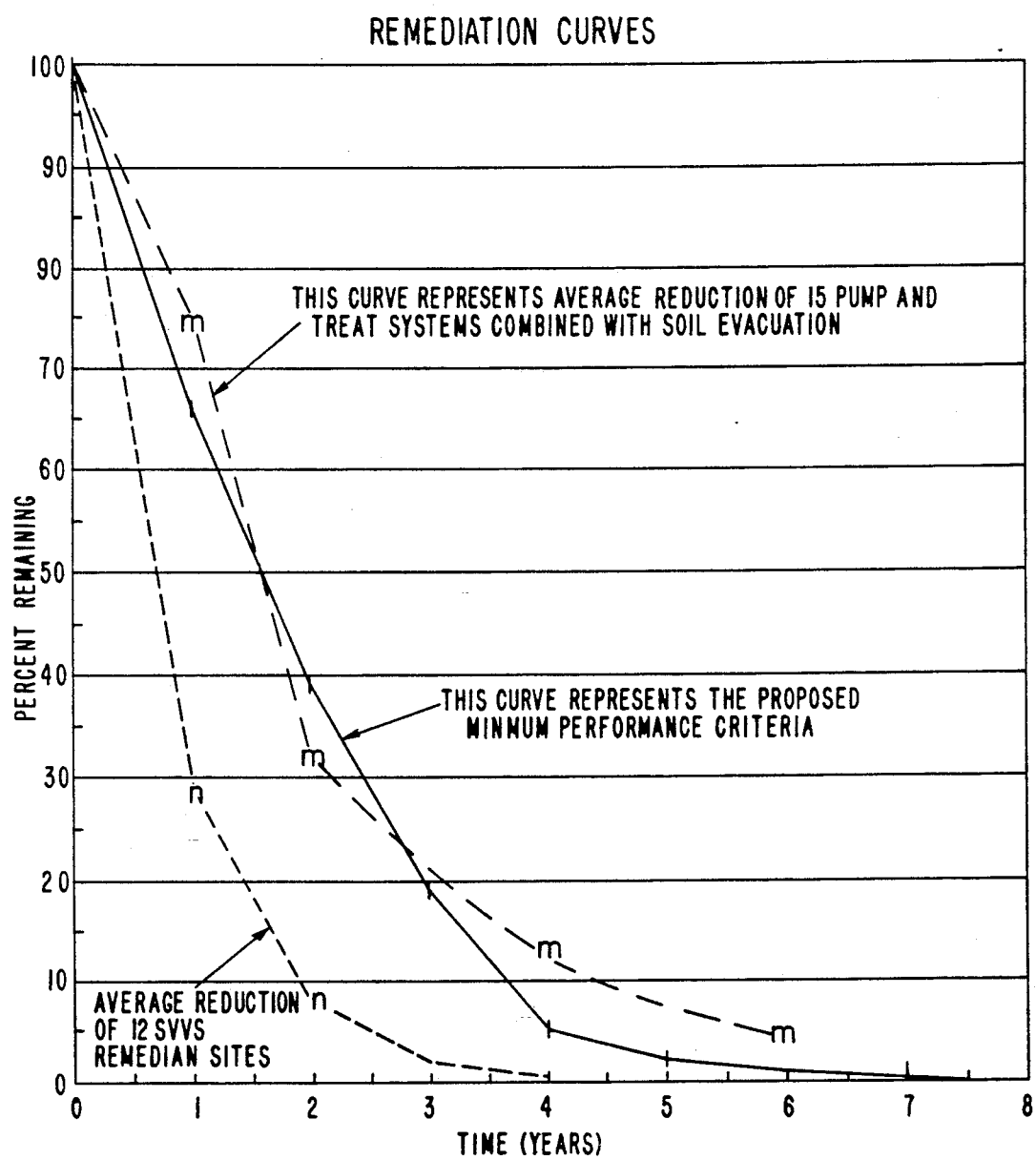
FIG. 10 is a graph comparing rates of remedition by the present invention and "pump and treat" systems with statutory requirements.

The methods and apparatuses of the present invention were employed at twelve remediation sites, and the results compared with fifteen sites remediated by a combination of "pump and treat" and soil evacuation systems. The average results are presented in FIG. 10, with results extrapolated after approximately two years for the present invention.

EXAMPLE 2

Figure 11:
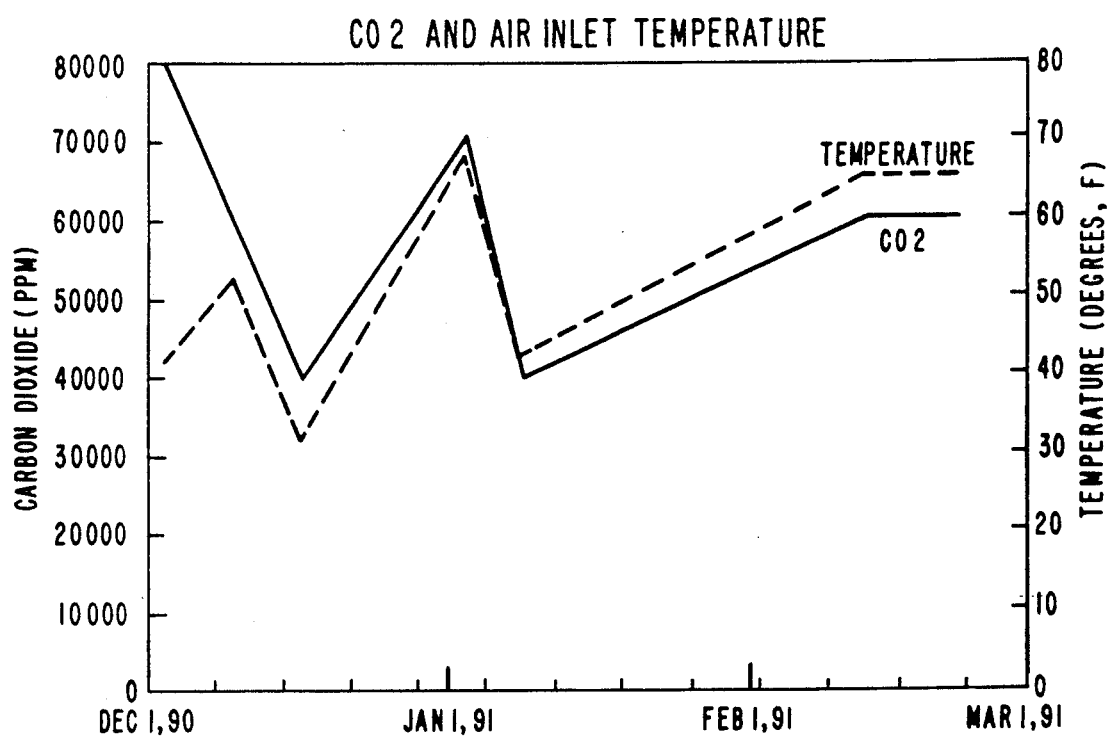
FIG. 11 is a graph showing the relationship of temperature to $CO_2$ emissions over time.

At one site contaminated by diesel fuel, the relationship between temperature and $CO_2$ was charted. The results are depicted by line graph in FIG. 11. Increasing temperature results in increased biological activity and increased stack emissions of $CO_2$, thus demonstrating both the effects of temperature and of bioremediation at the site.

EXAMPLE 3

Figure 12:
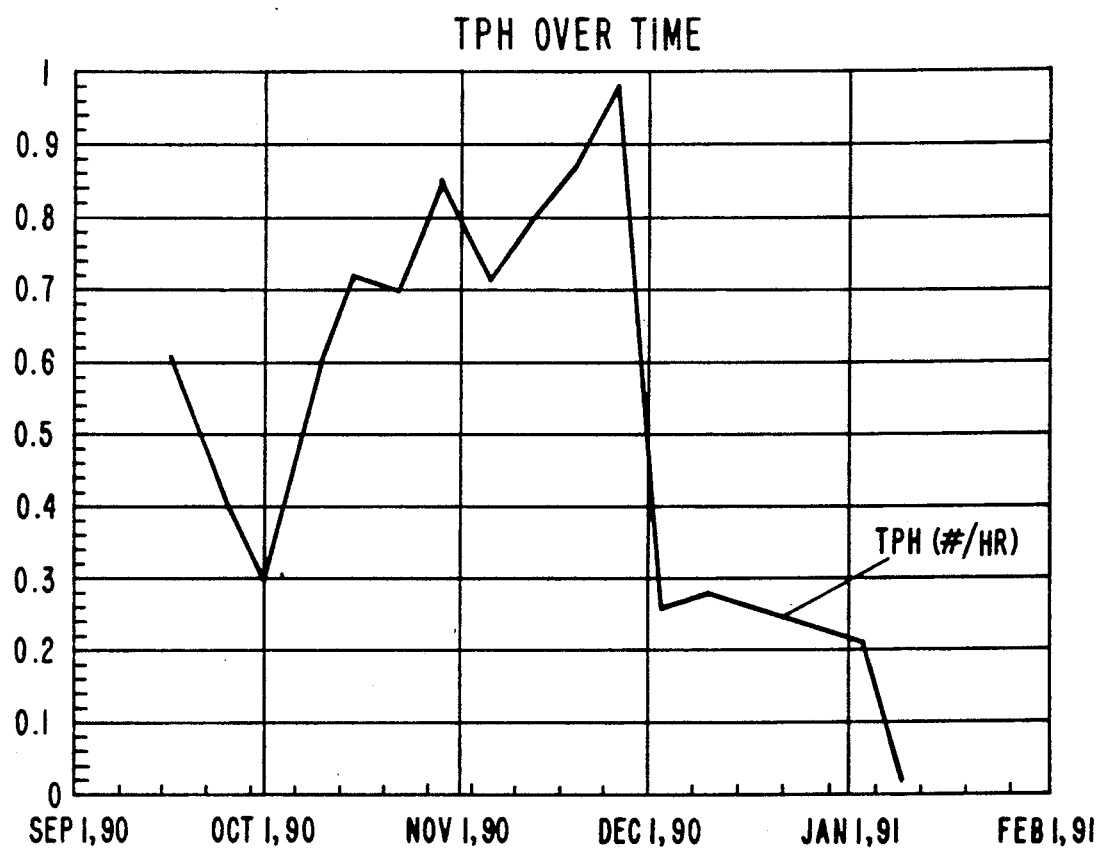
FIG. 12 is a graph showing rates of emission of total petroleum hydrocarbons over time by a pure vacuum extraction system.
Figure 13:
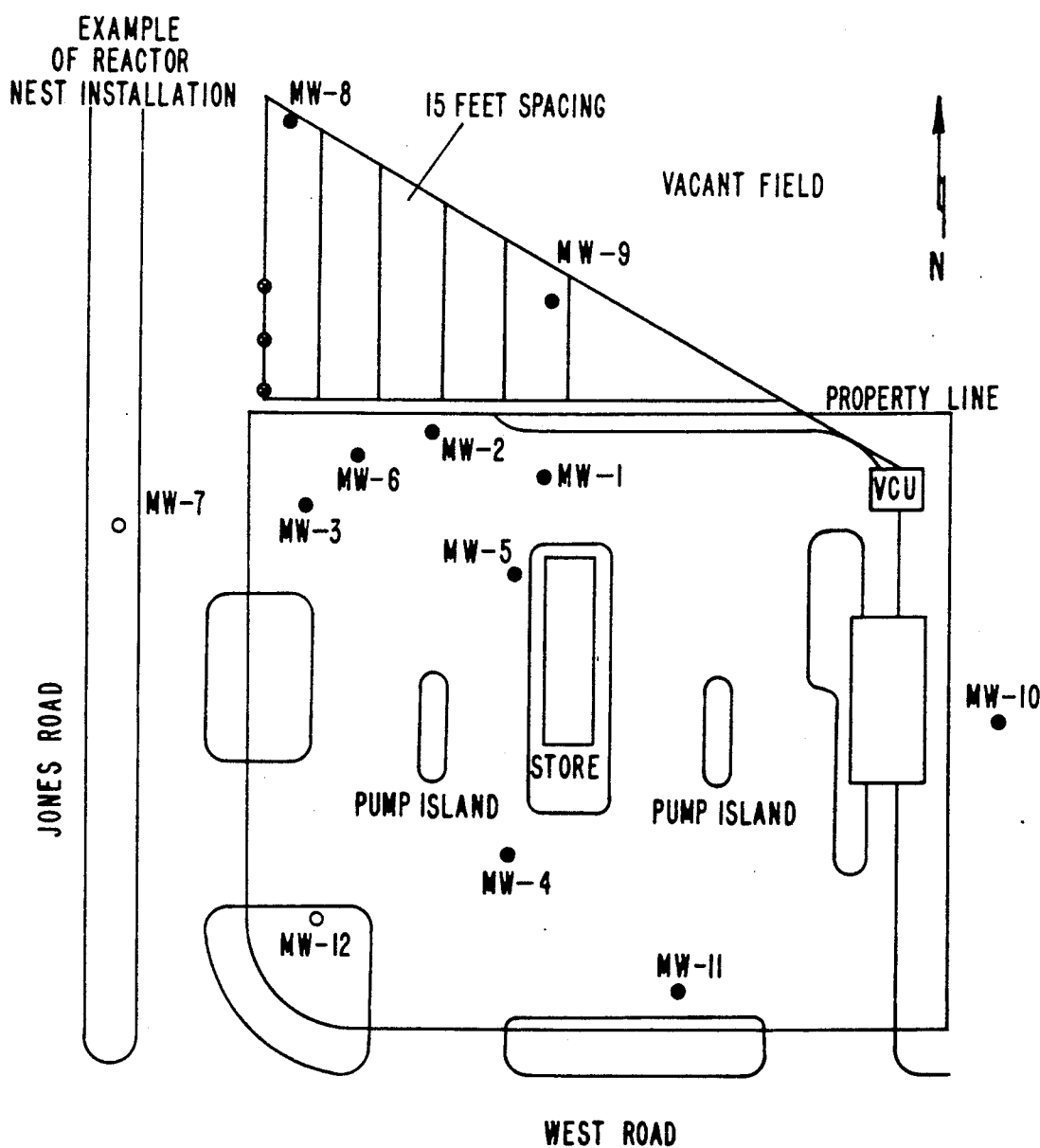
FIG. 13 to 32 are illustrations of installation of the invention at different actual and proposed sites.
Figure 14:
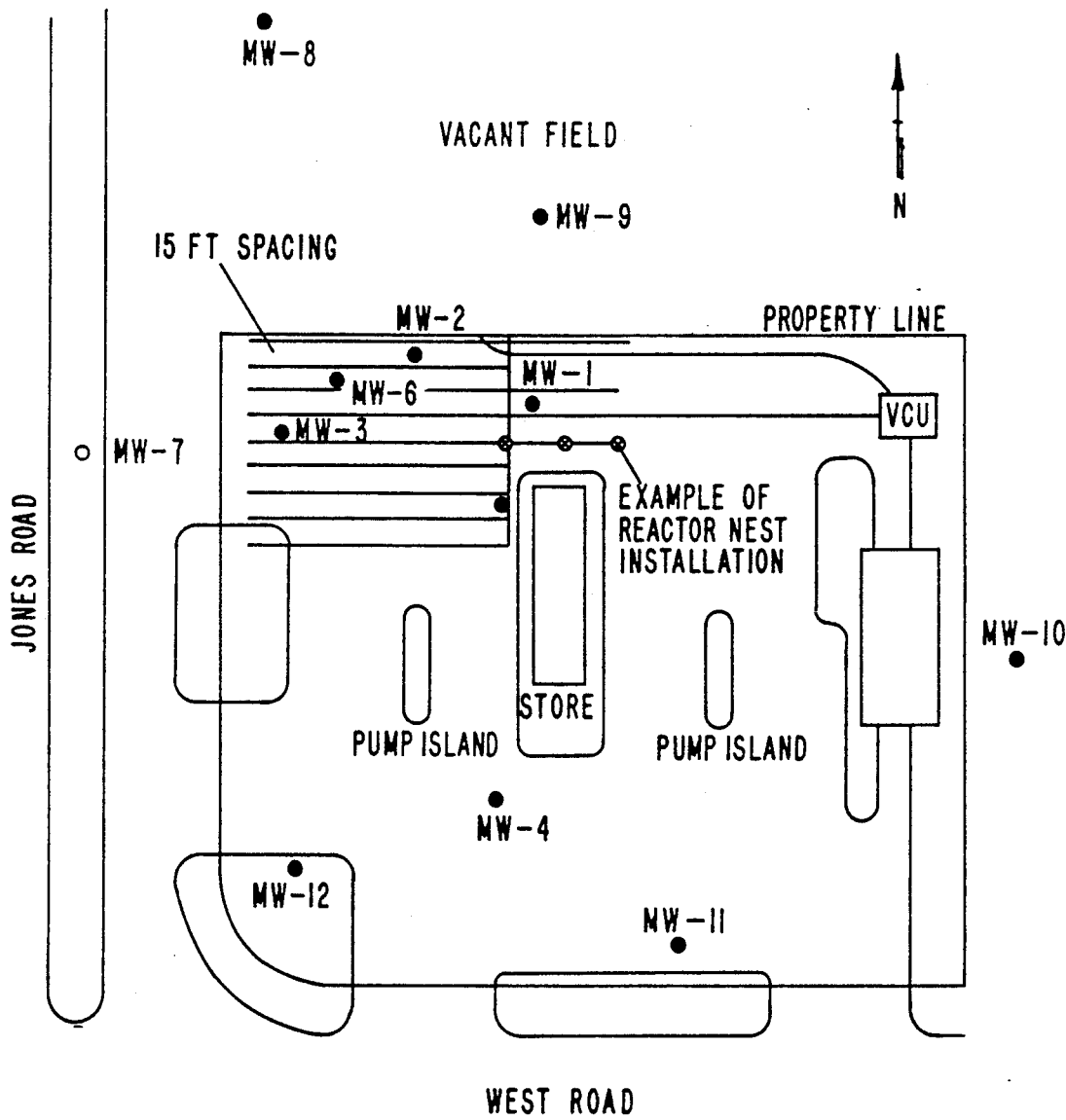
Figure 15:
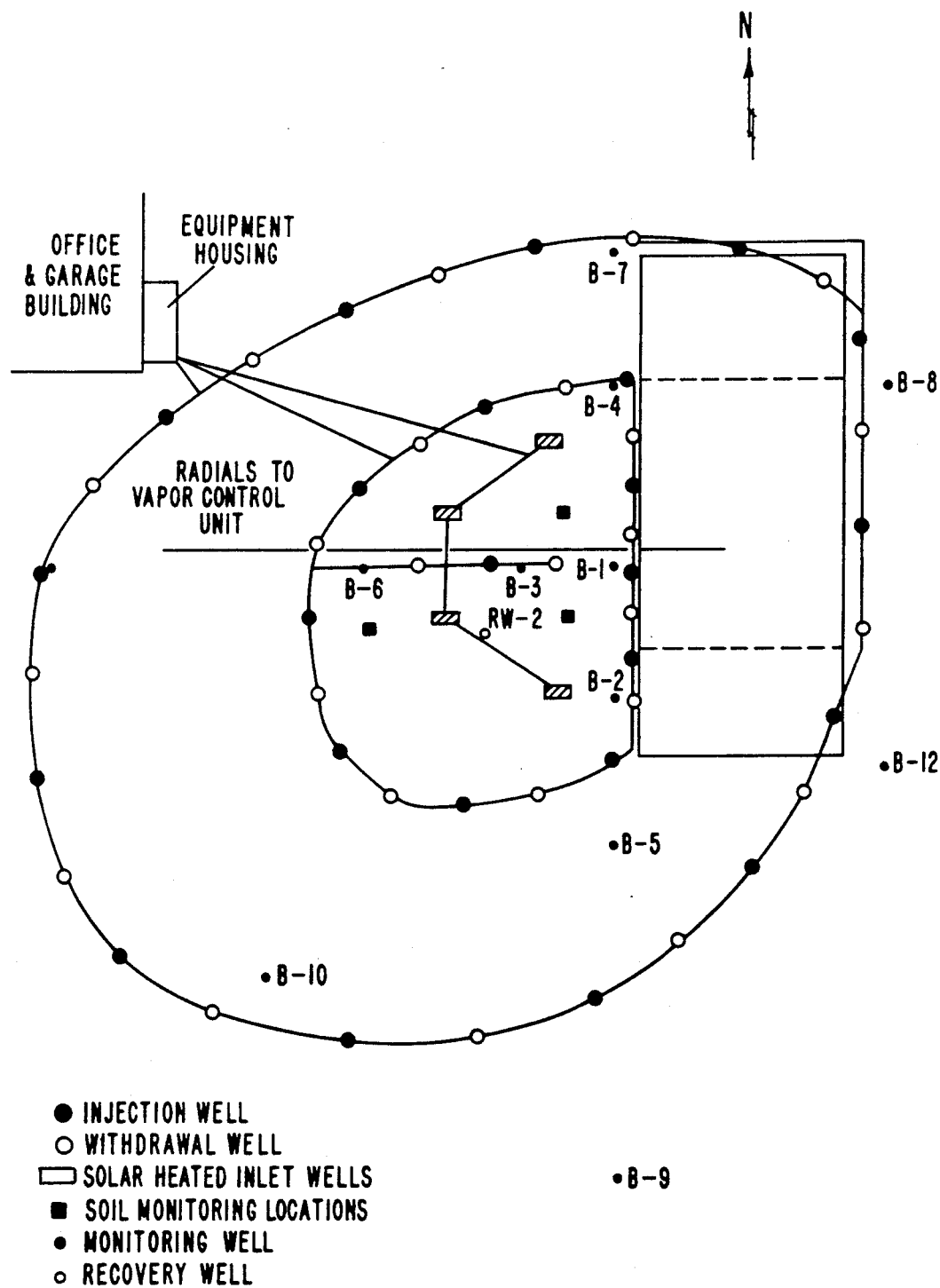
Figure 16:
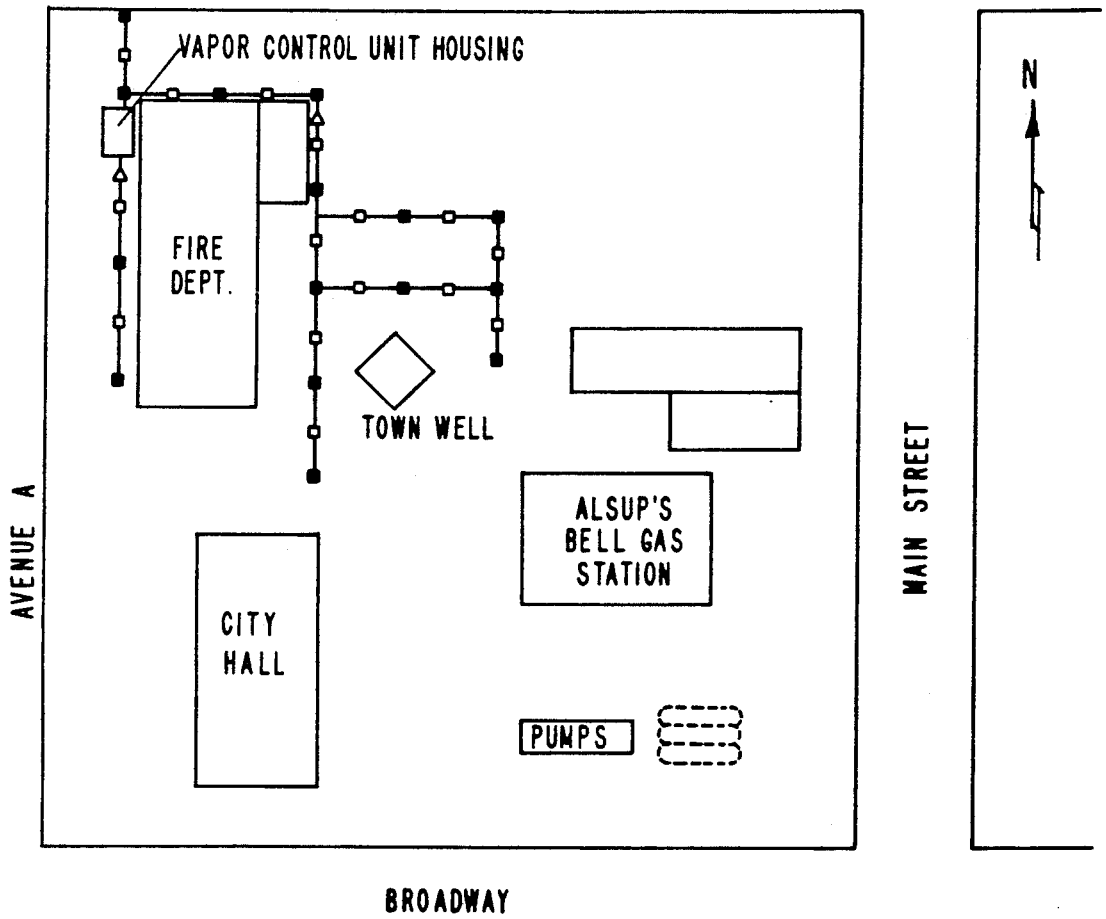
Figure 17:
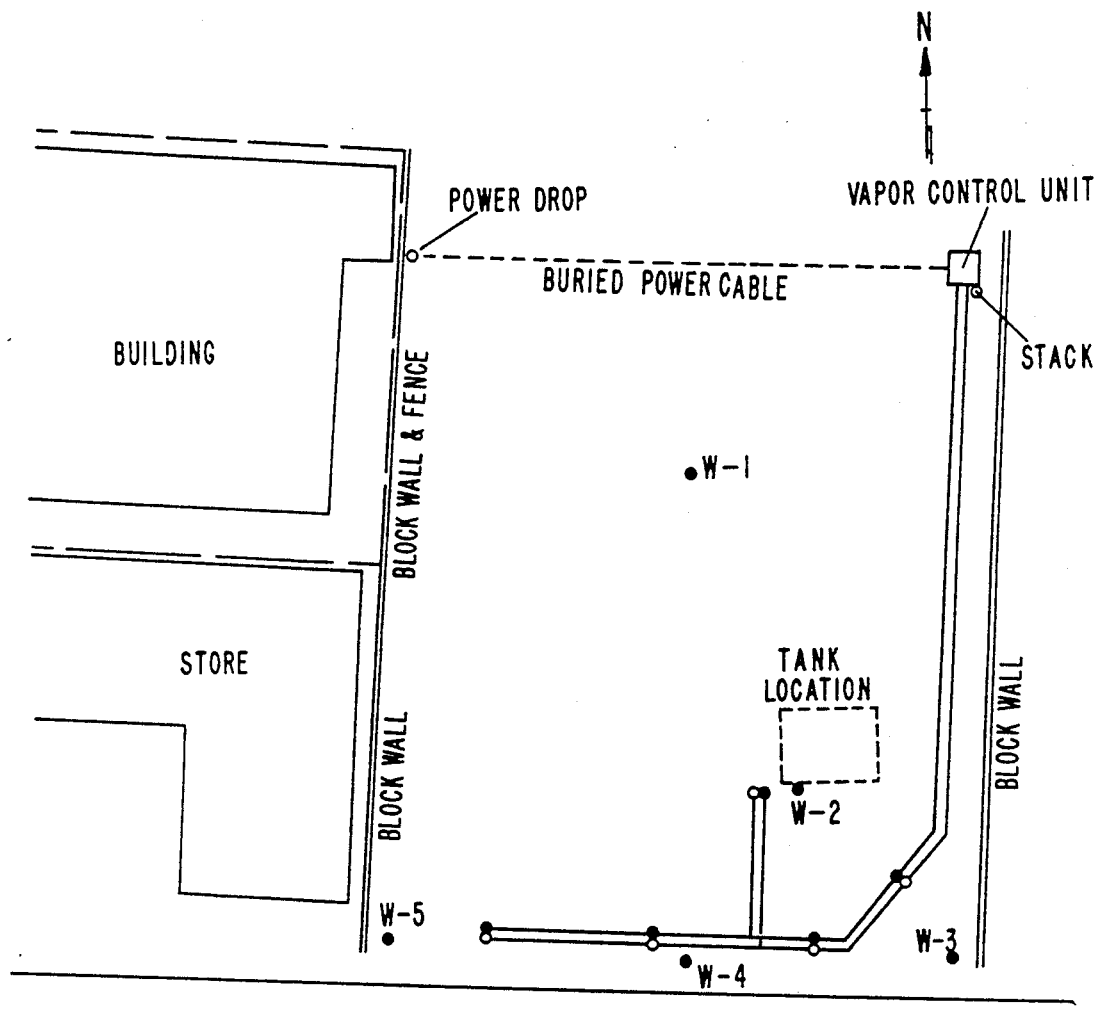
Figure 18:
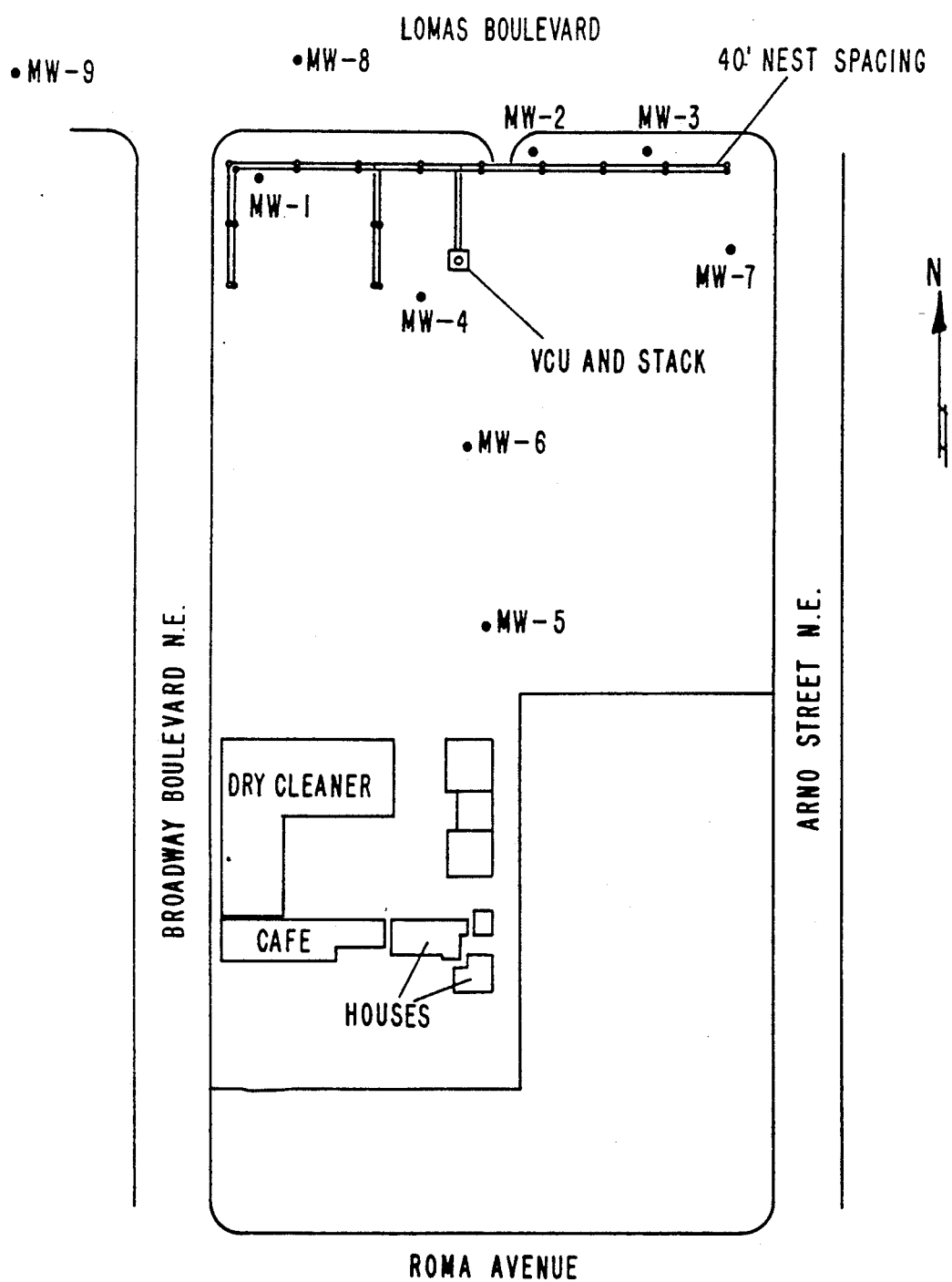
Figure 19:
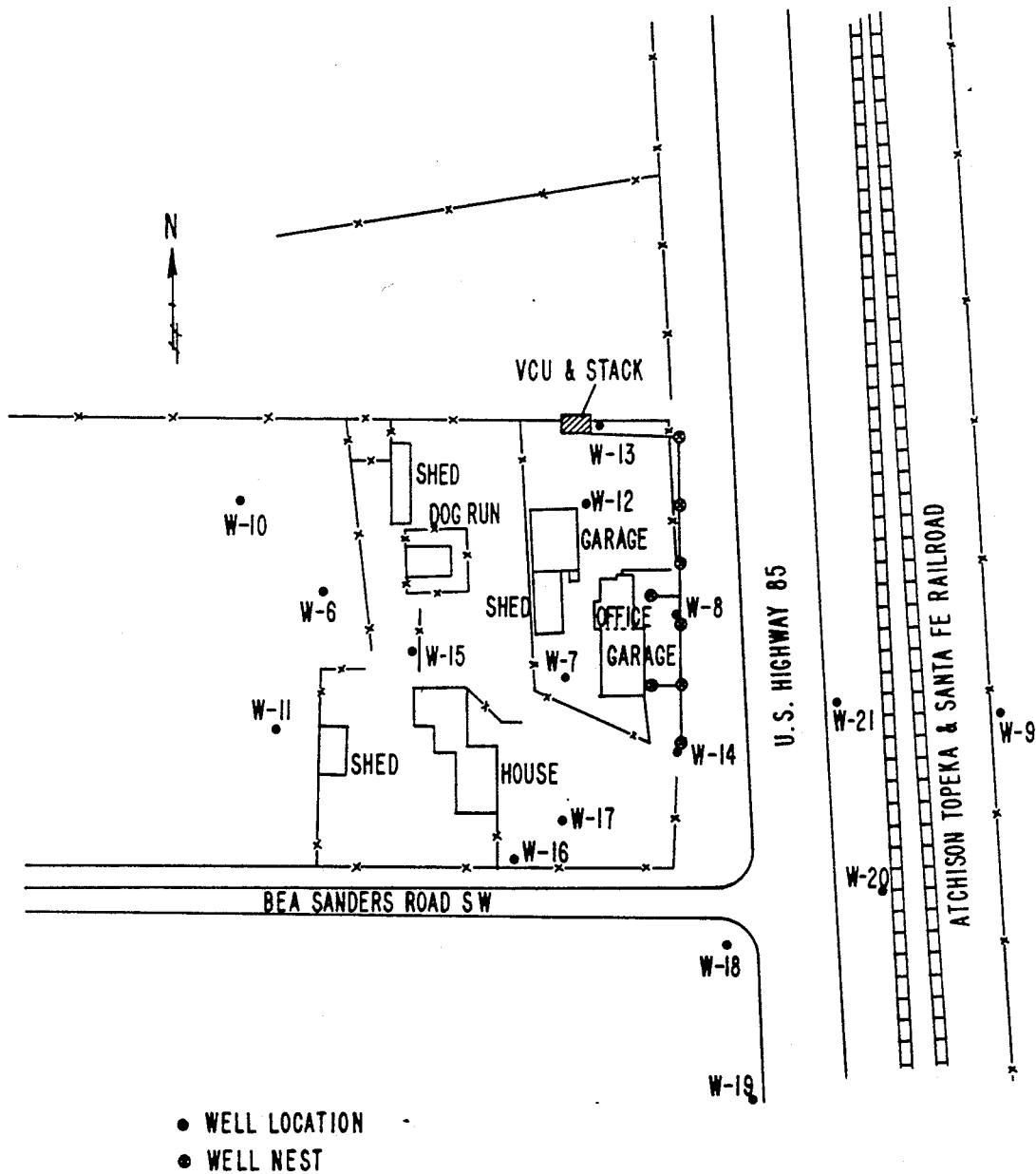
Figure 20:
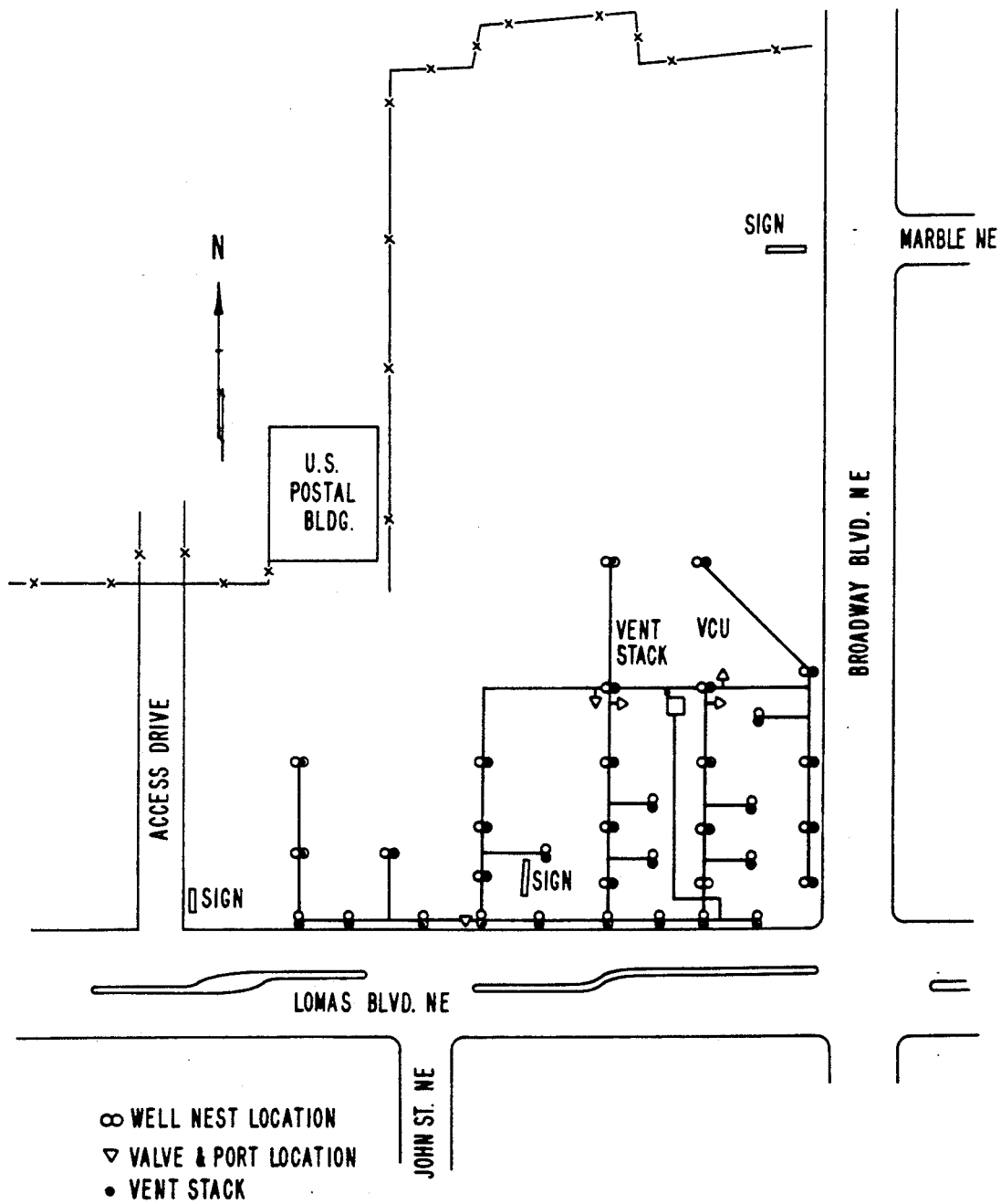
Figure 21:
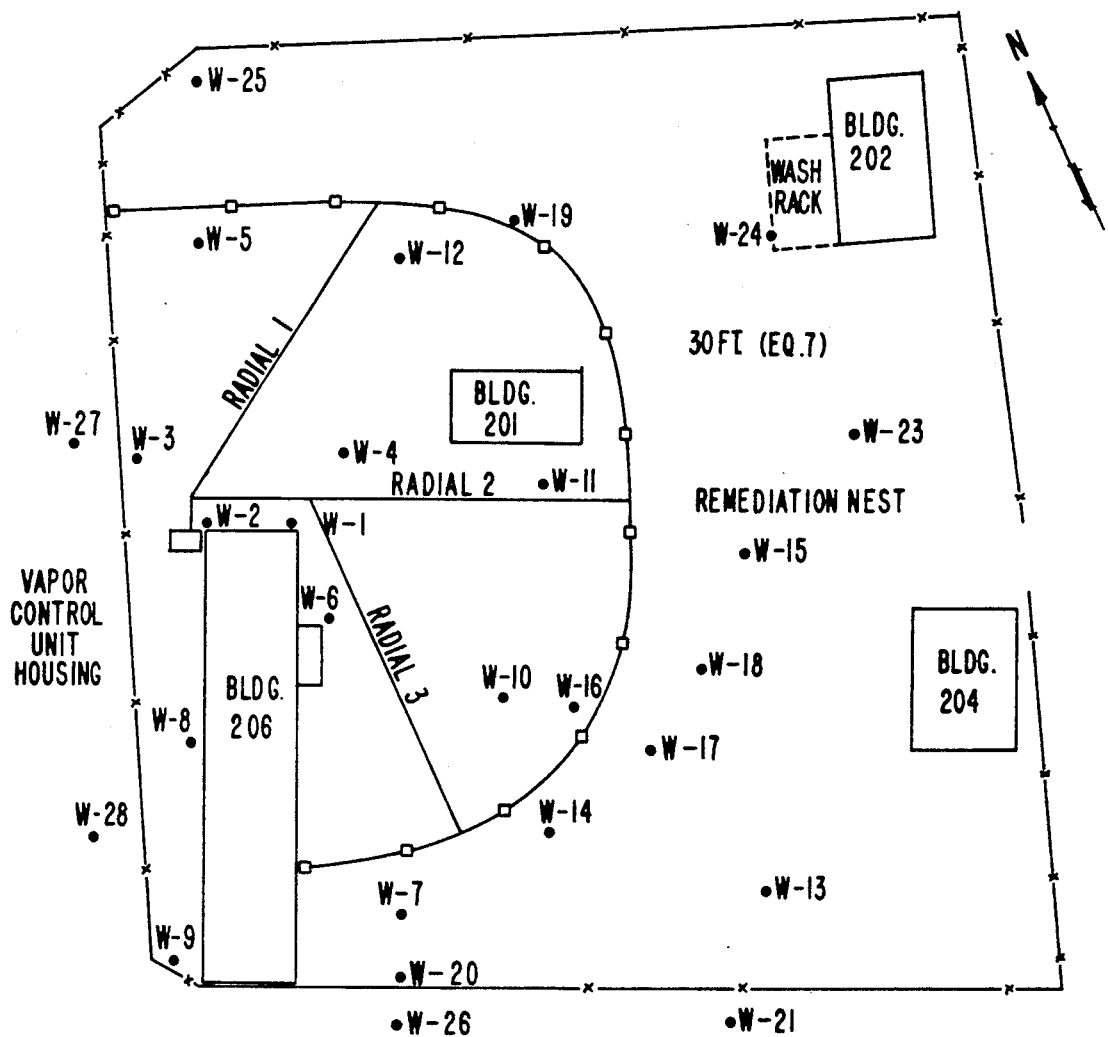
Figure 22:
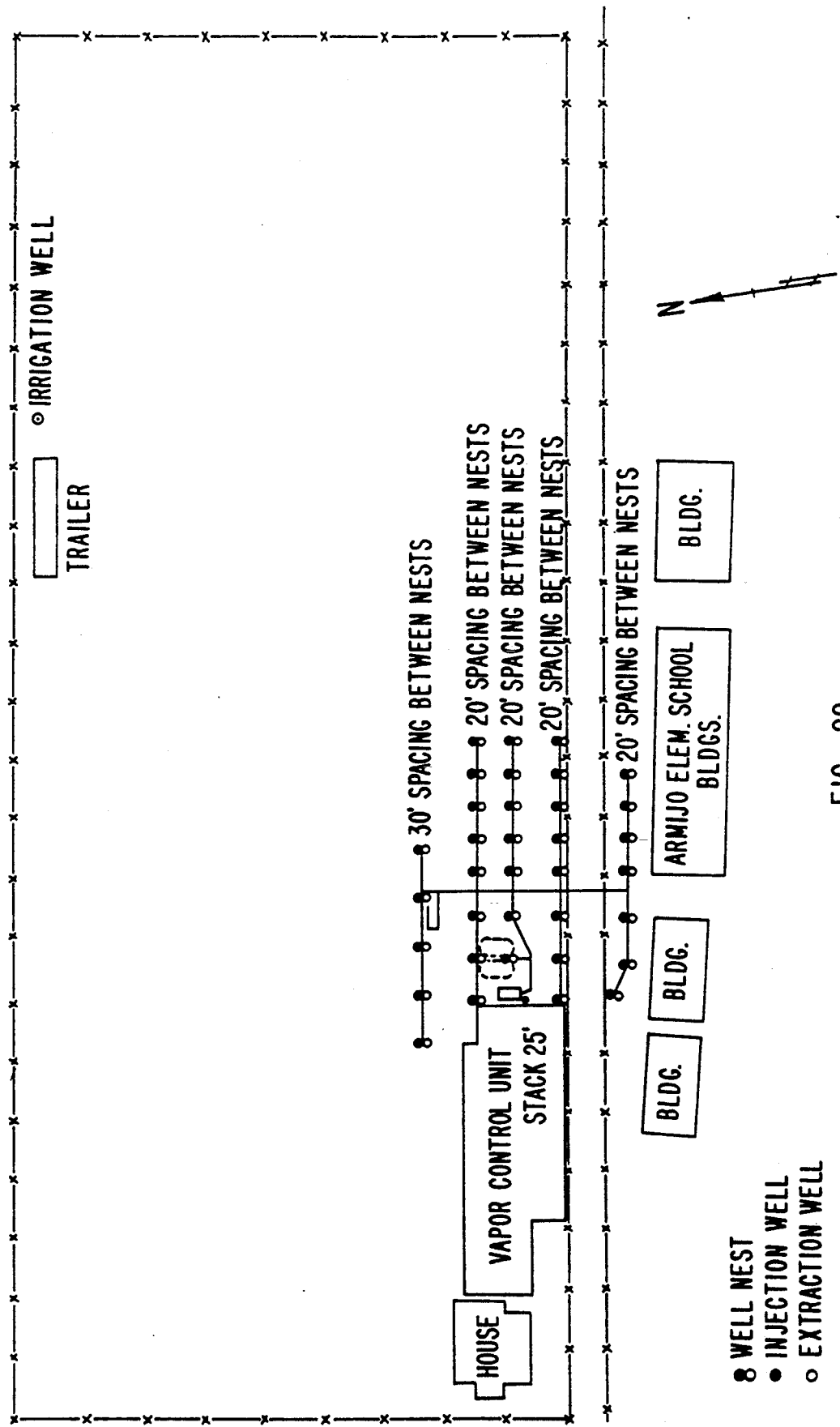
Figure 23:
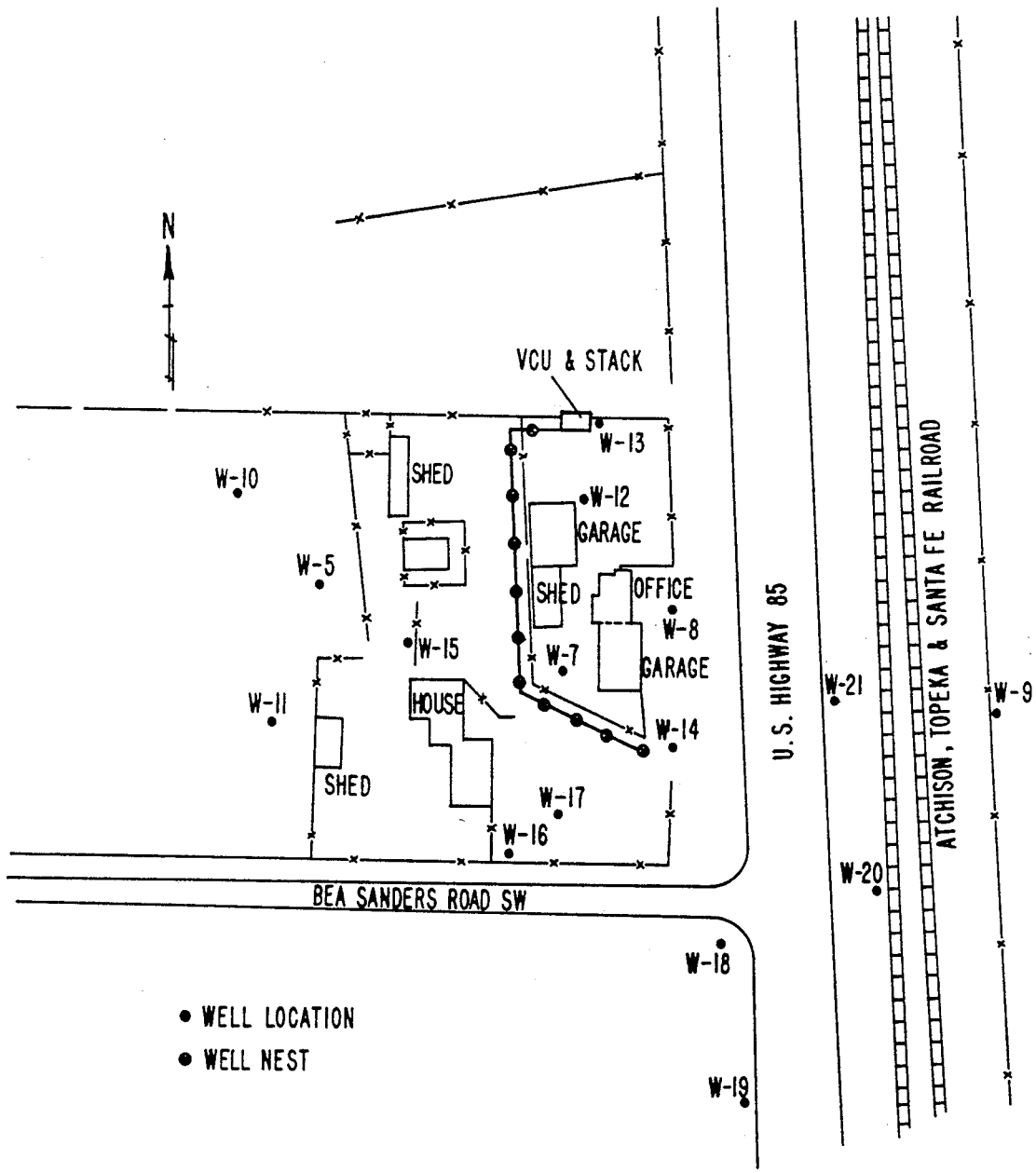
Figure 24:
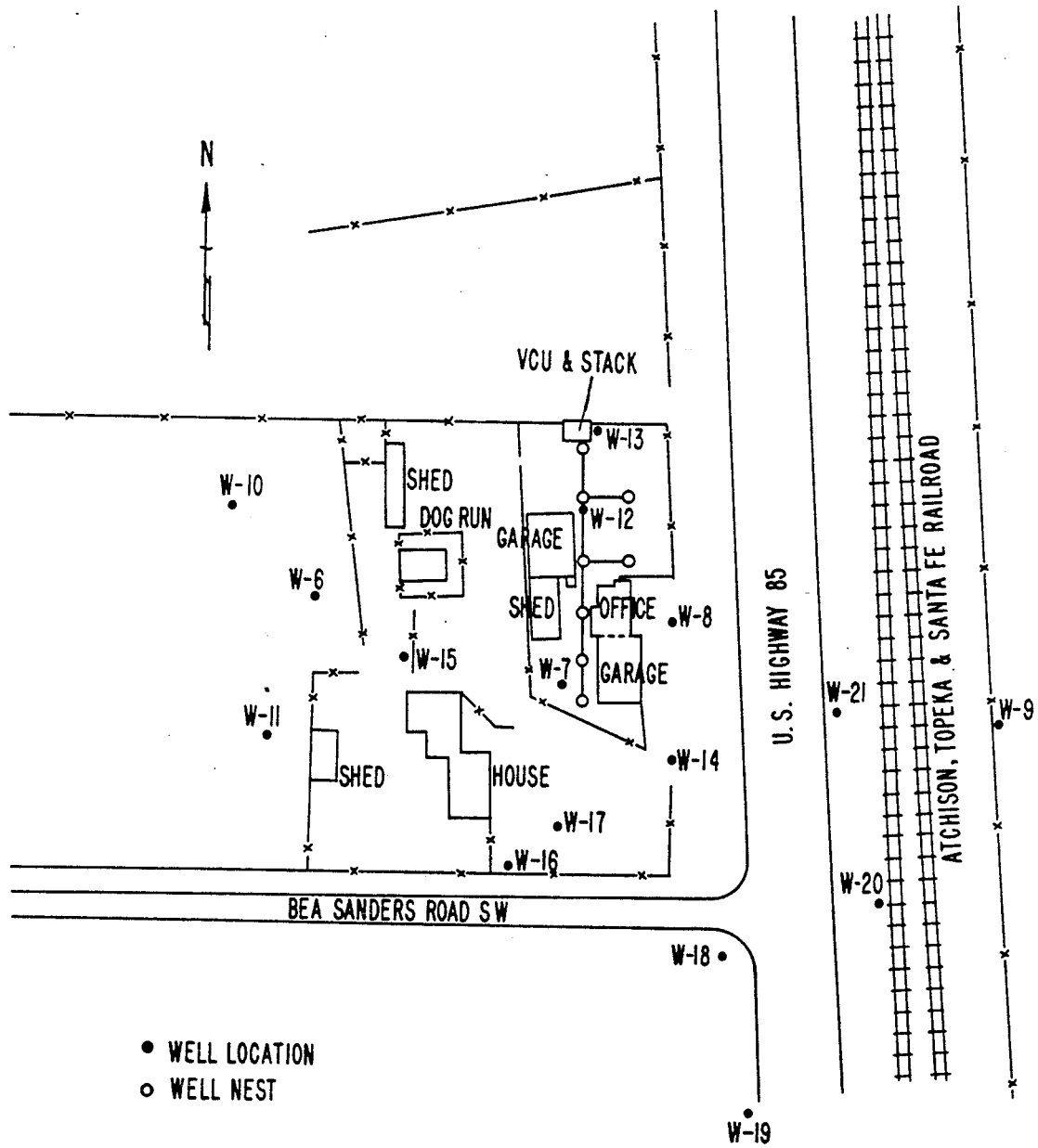
Figure 25:
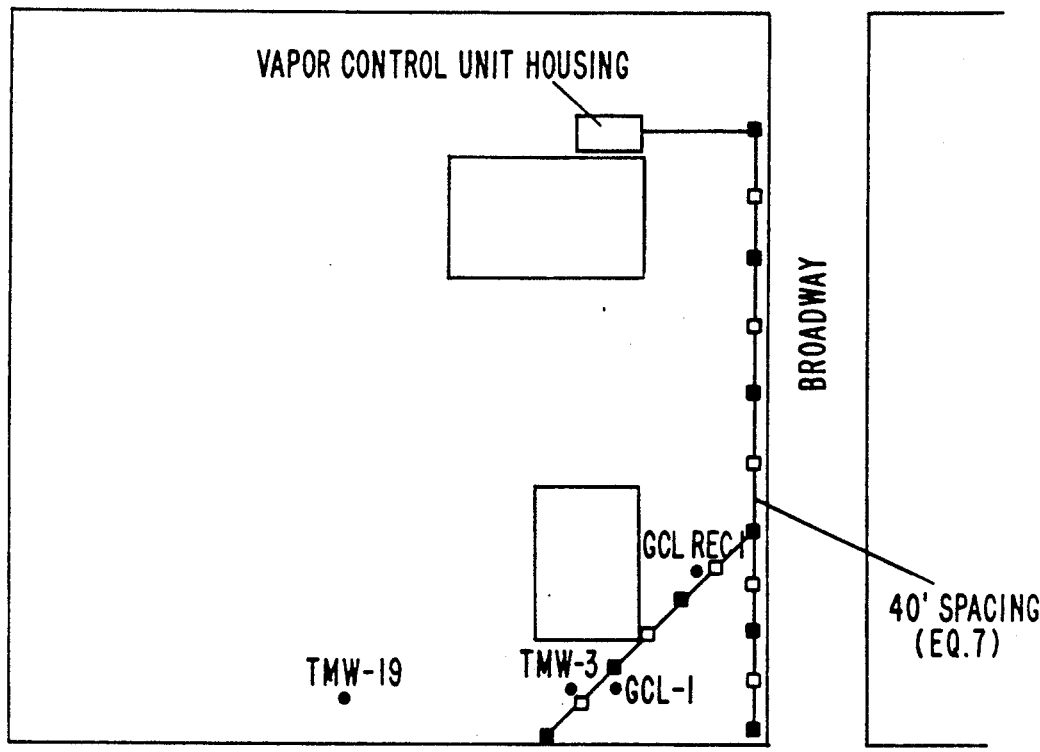
Figure 26:
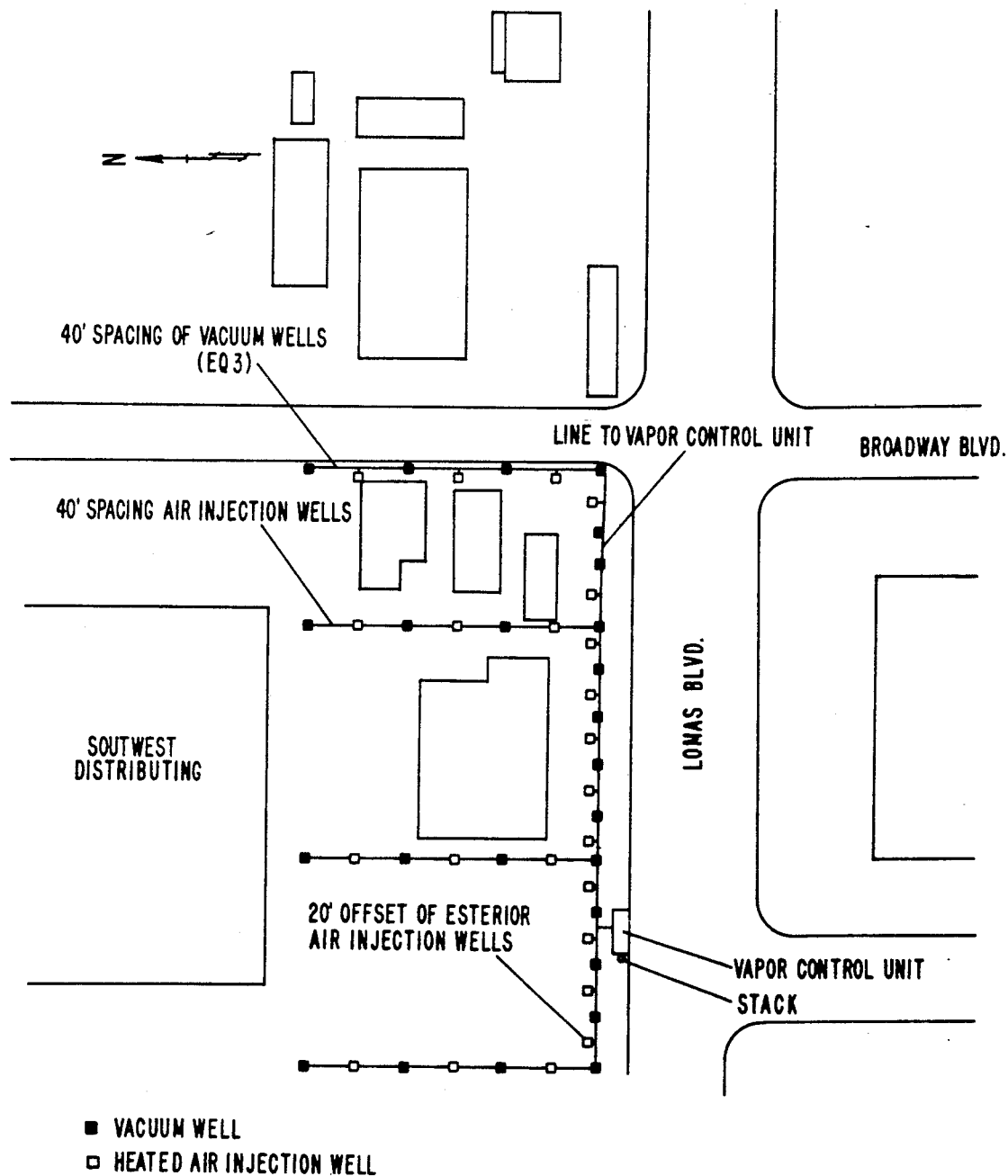
Figure 27:
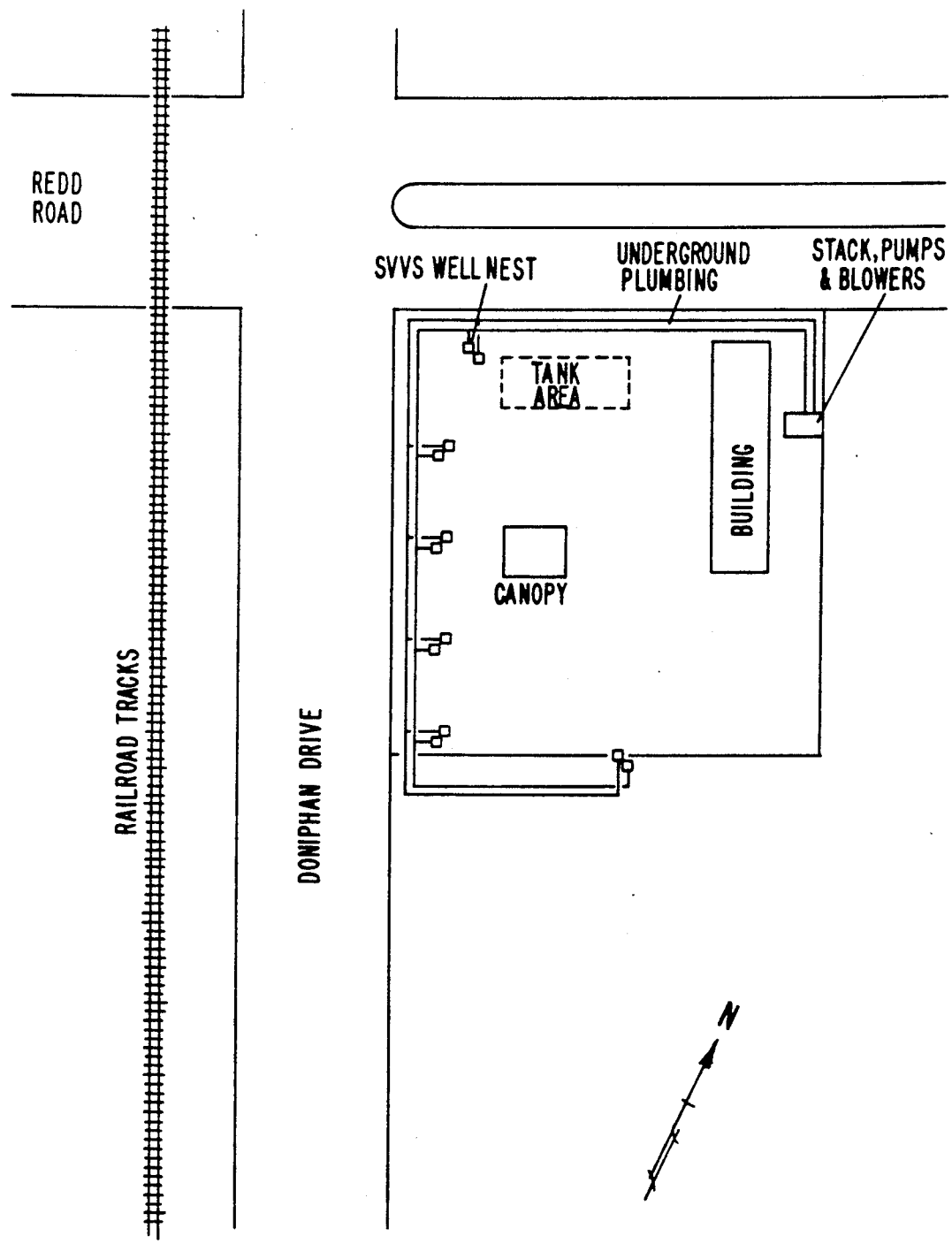
Figure 28:
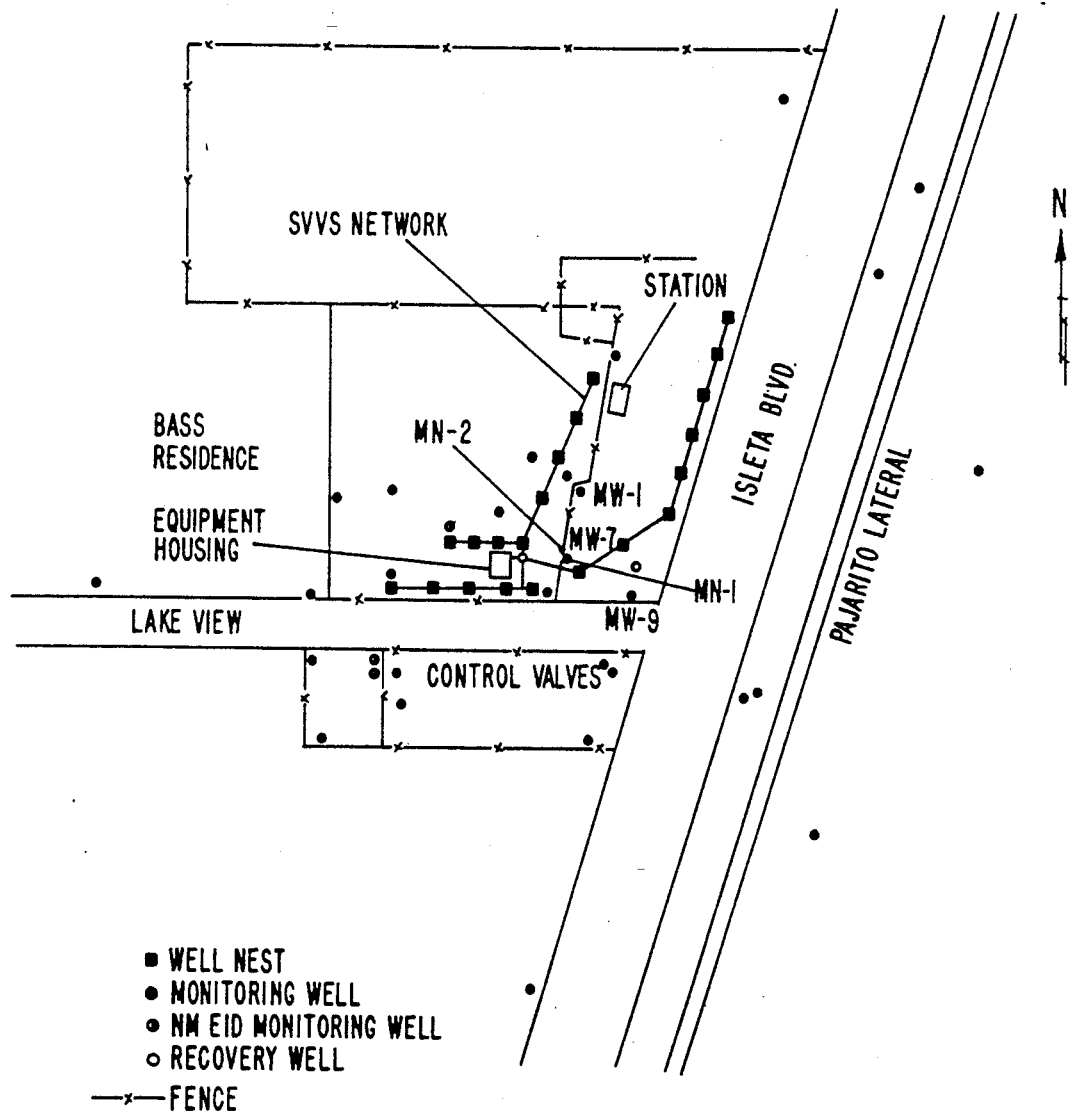
Figure 29:
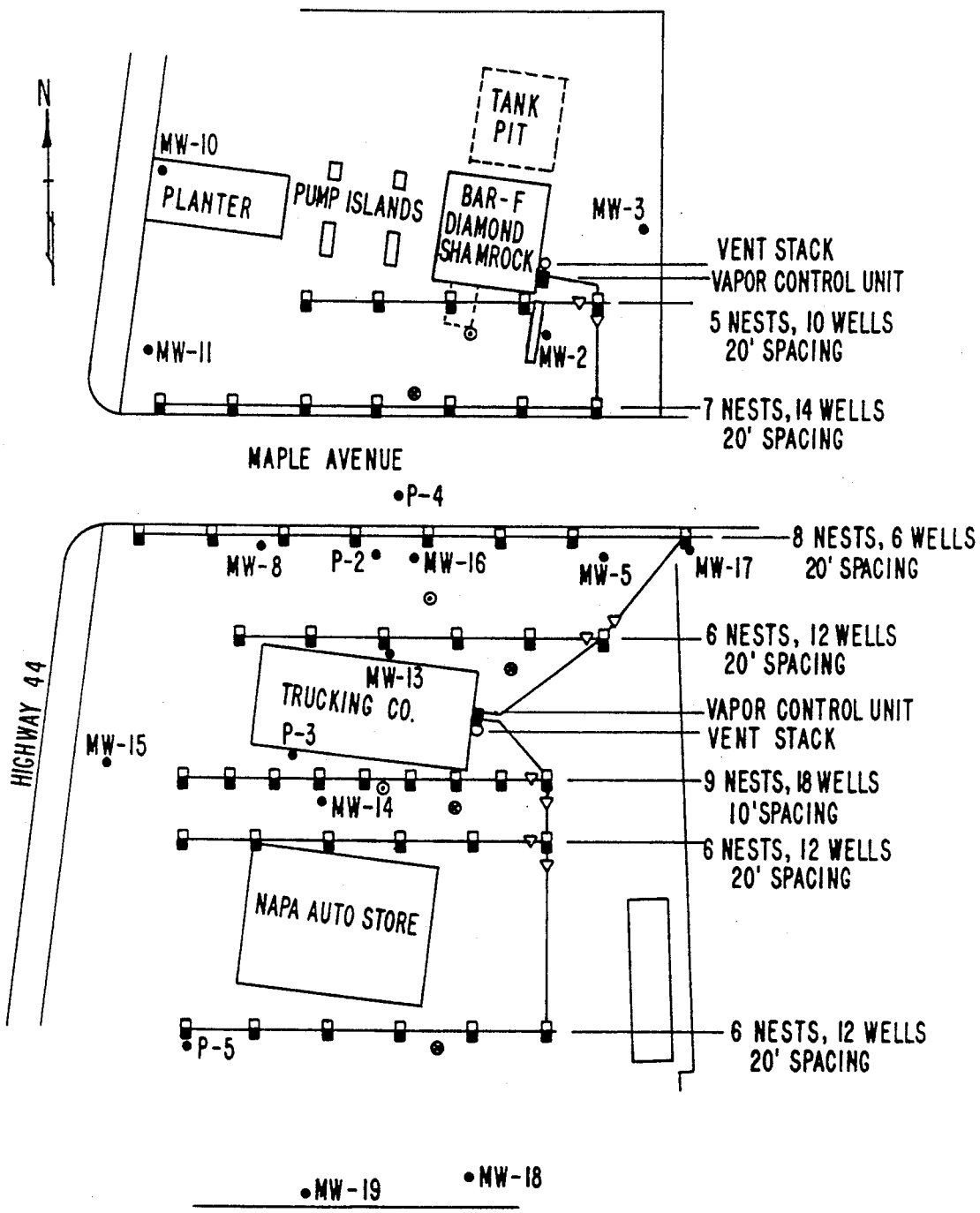
Figure 30:
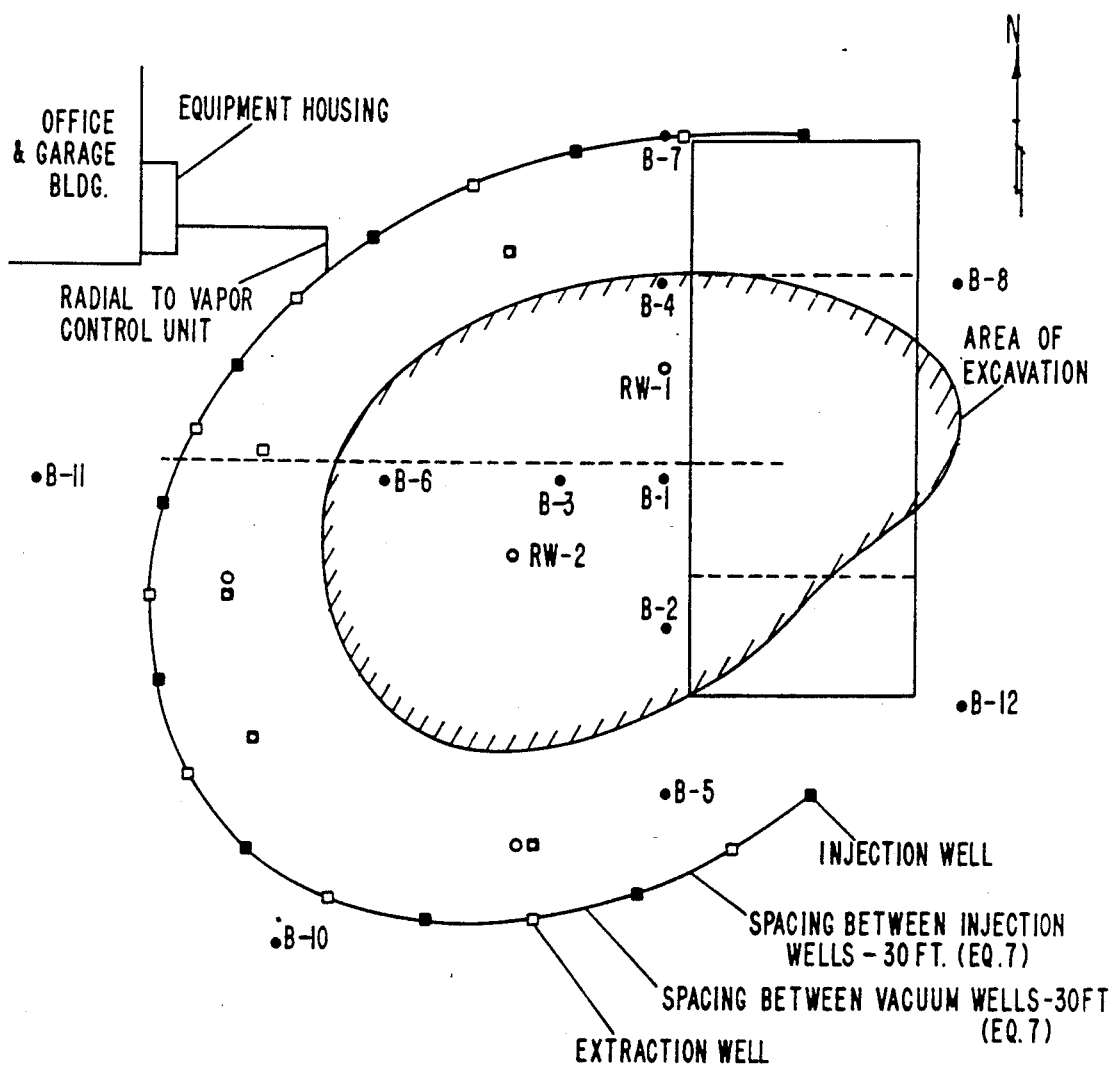

At one site contaminated by diesel fuel, a pure vacuum extraction system was employed Stack emissions of total petroleum hydrocarbons (TPH) over time is are depicted in FIG. 12. TPH emissions first rapidly increase, then rapidly decrease. The rapid completion of remediation at the site will likely require air injection, microbe extraction, fermentation, and re-insertion, or stimulation of microbe growth, or some combination thereof.

EXAMPLE 4

The design of several proposed and installed sites employing the methods and apparatuses of the present invention are depicted in FIGS. 13 to 30. The technology embodying the invention is referred to as SVVS TM in these figures.

EXAMPLE 5

Figure 31:
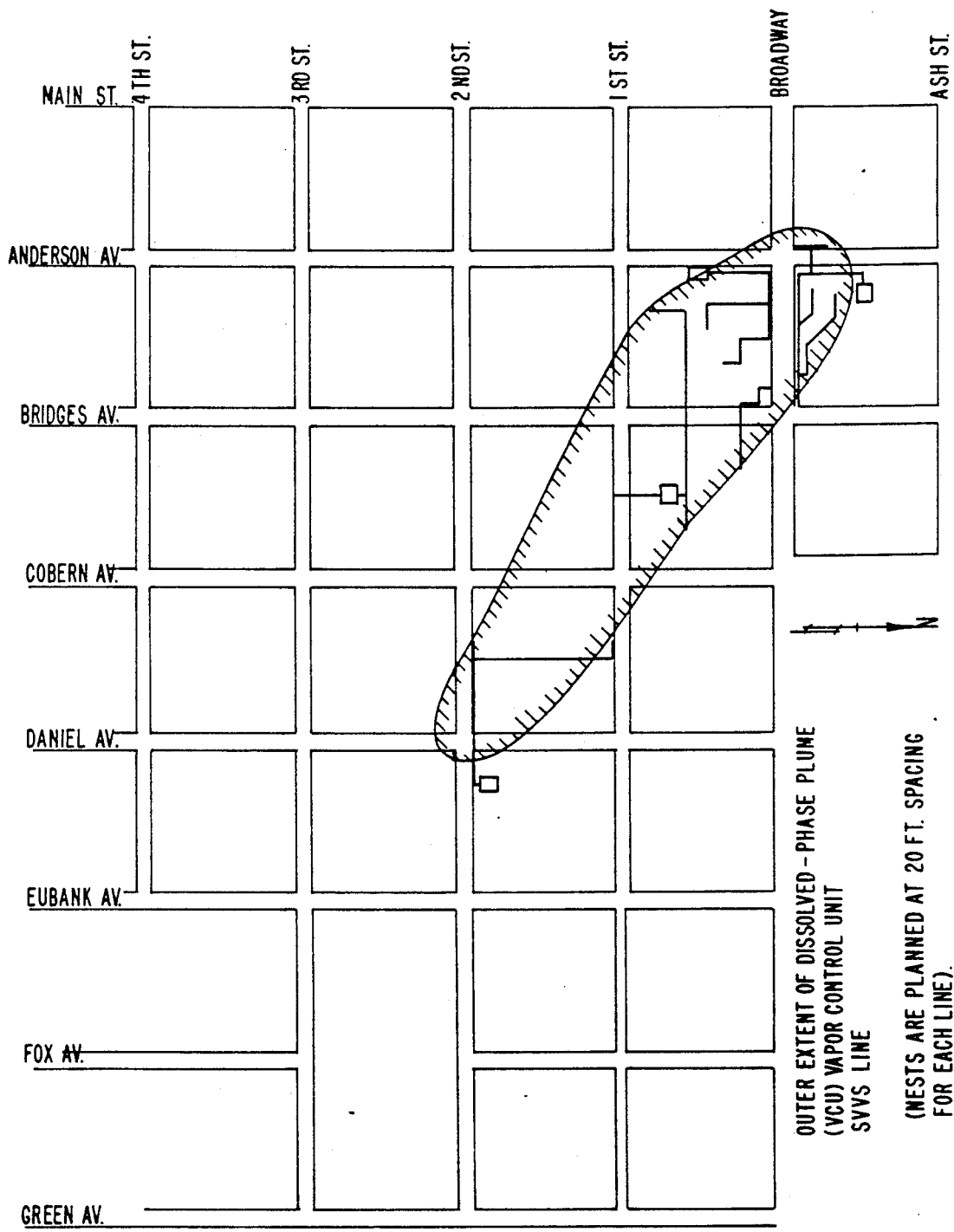
Figure 32:
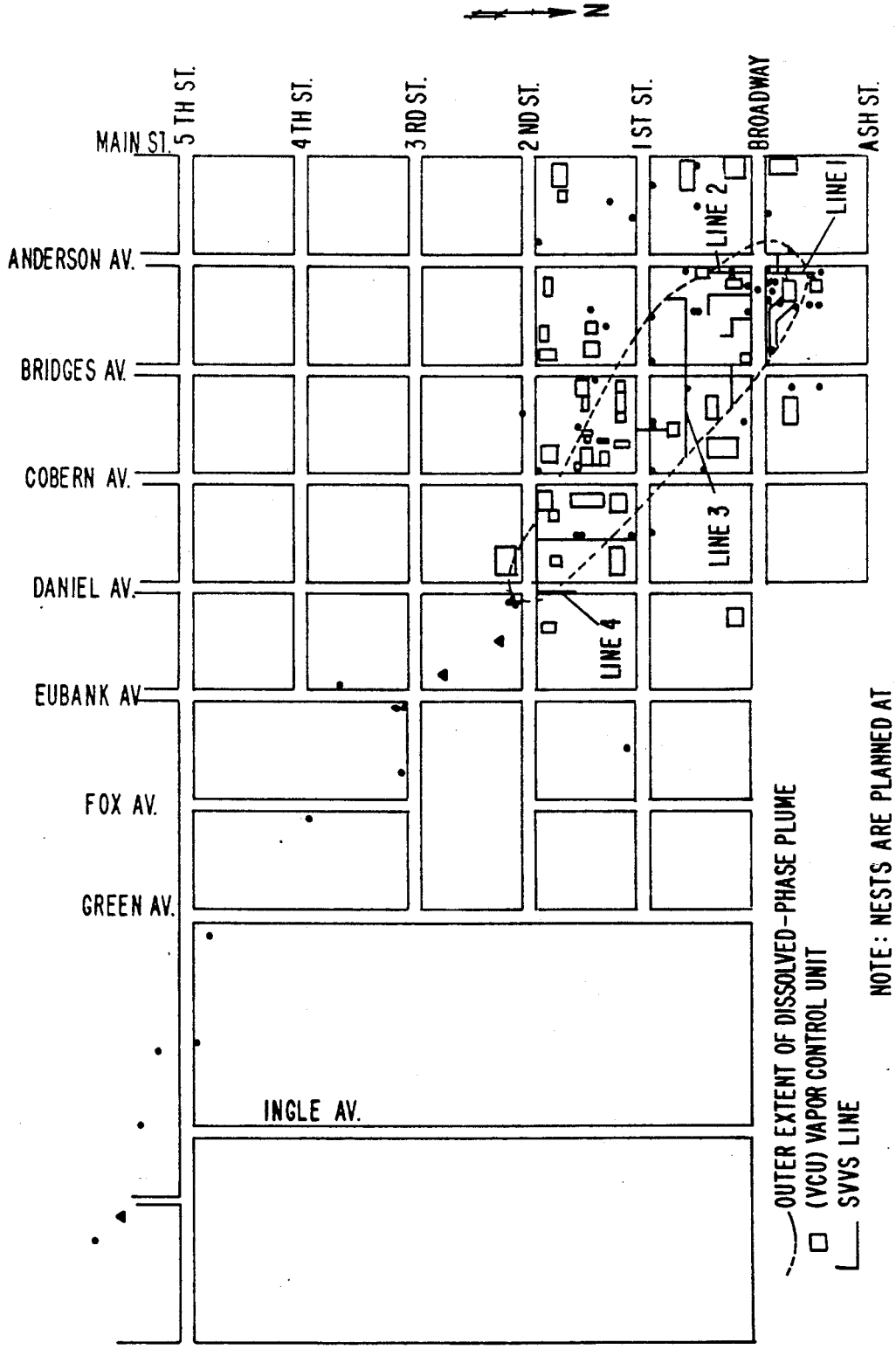

A particularly difficult and large contamination site in New Mexico and its proposed treatment by the methods and apparatuses of the present invention is depicted in FIGS. 31 and 32. The contamination plume affected all of the city's drinking water wells. The remediation system was limited by certain property boundaries and buildings which limit access to the plume. The project was offered to all consultants holding state remediation contracts. The present technology was the only technology accepted by the state as being capable of remediating this site.

EXAMPLE 6

Figure 33:
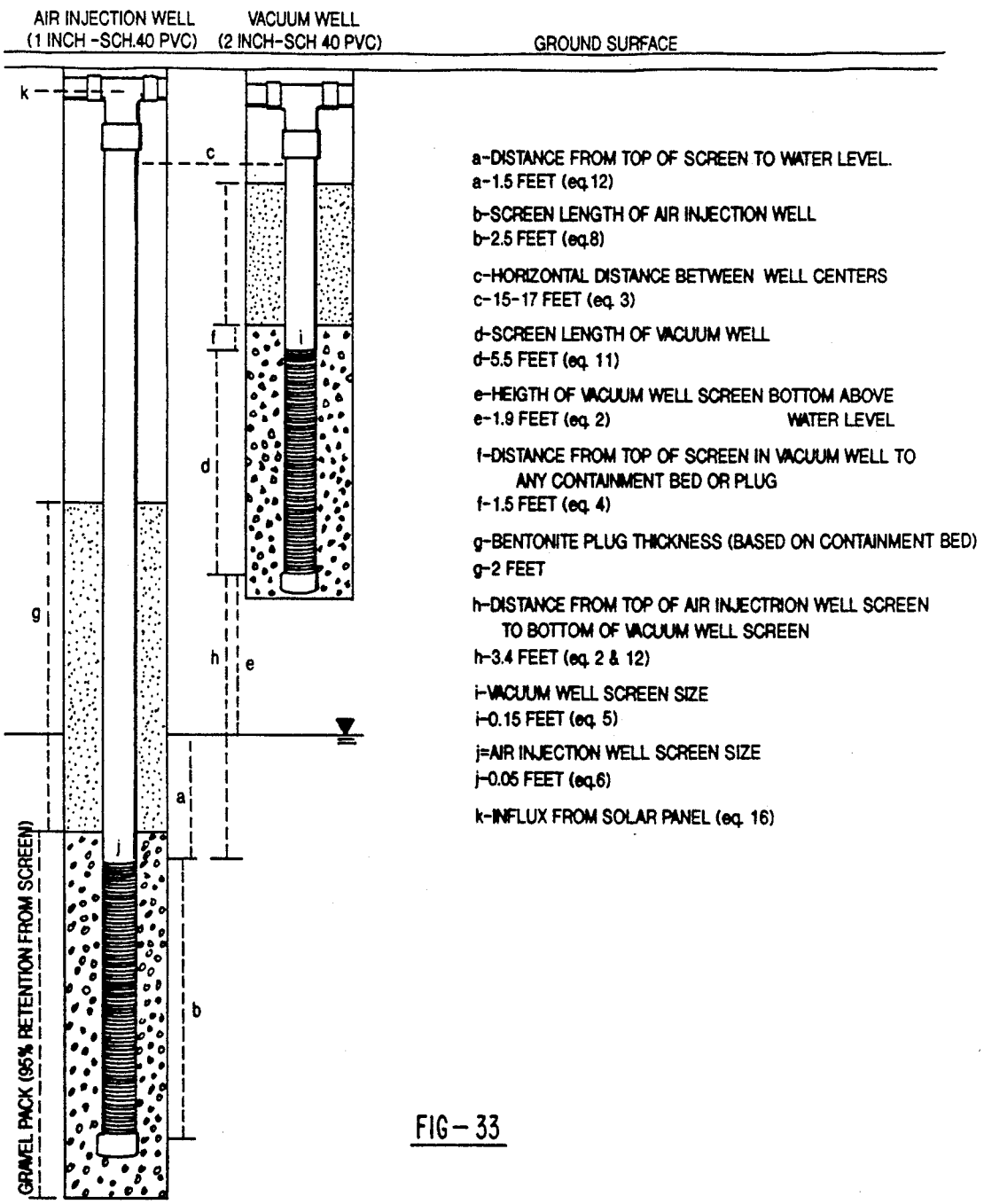
FIG. 33 is an illustration of installation of a reactor nest of the invention at a shallow vertical site.

FIG. 33 depicts an example of a shallow vertical installation of a "reactor nest" of the present invention.

EXAMPLE 7

Figure 34:
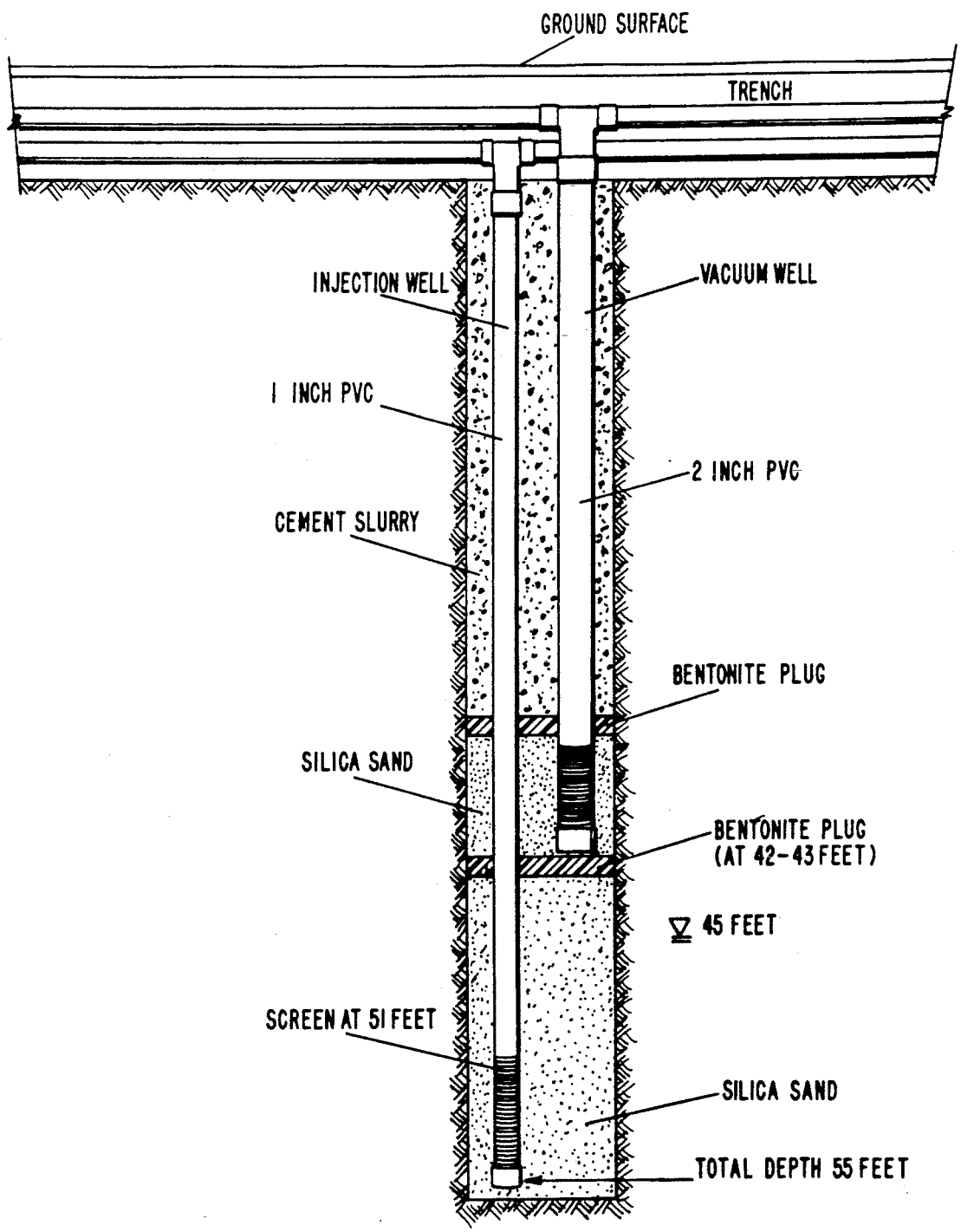
FIG. 34 is an illustration of installation of a reactor nest of the invention at a deep vertical site.

FIG. 34 depicts an example of a deep vertical installation of a "reactor nest" of the present invention. By utilizing the same drill hole for both extraction and injection wells, a significant decrease in drilling costs are realized.

EXAMPLE 8

Figure 35:
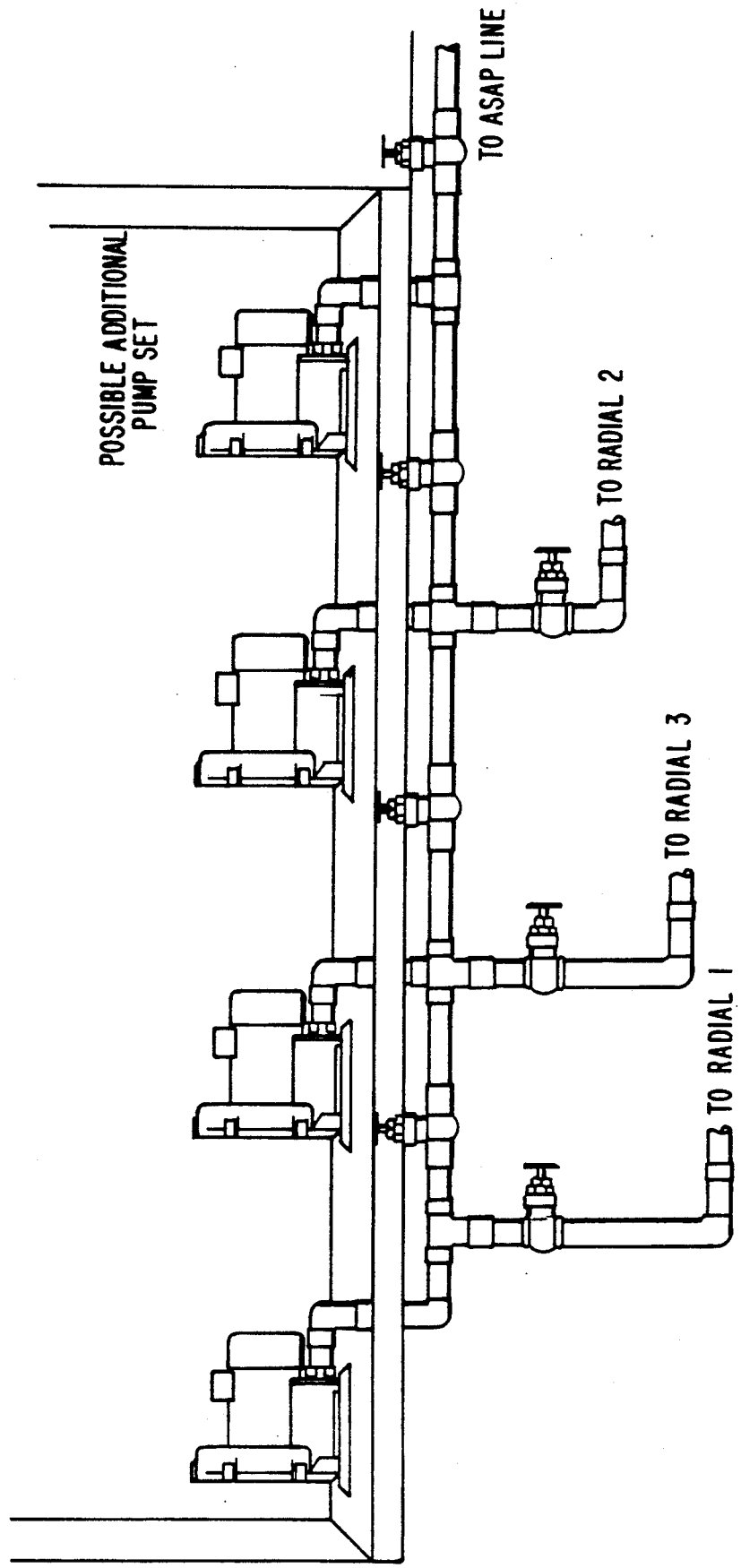
FIG. 35 is an illustration of a multi-pump manifold of the invention.

FIG. 35 depicts an example of a multi-pump manifold employed with the present invention. The manifold allows remediation stress to be moved around the pollution site and varied in intensity, as required by initial variability of the contamination and by changes in contamination concentrations as remediation progresses.

EXAMPLE 9

FIG. 36 depicts an example of a monitoring well employable with the present invention. Monitoring is essential for gathering information needed to make decisions as to controlling and varying types and intensities of remediation stresses on a given contaminated site.

EXAMPLE 10

Additional information on sites remedied by the methods and apparatuses of the present invention, information on remediation by prior technology, and information on rates of remediation using the present invention are presented in two publications of Billings & Associates, Inc., *Developments in Remediation and SVVS TM Remediation Technology*, which are incorporated herein by reference.

What is claimed is:

1. A method of in situ air sparging, vacuum extraction and bioremediation for removal of contaminants from soil and from groundwater present in the soil in the form of a groundwater aquifer, there being a vadose soil zone existing down to a water table defining the upper boundary of the groundwater aquifer, the method comprising the steps of:
   a) establishing a plurality of well nests, each well nest comprising one or more injection wells extending through the vadose zone to a depth below the water table and one or more extraction wells in the vadose zone extending to a depth above the water table;
   b) injecting oxygen-containing gas into the injection wells;
   c) continuously stimulating with the oxygen-containing gas microorganisms present in the vadose zone;
   d) increasing the rate of biodegradation of volatile and non-volatile contaminants by substantially maximizing available oxygen introduced in situ via the injection wells;
   e) applying a vacuum to one or more extraction wells at a negative flow which is volumetrically greater than the positive glow of gas injected into the injection wells; and
   f) extracting, via the extraction wells, an effluent containing volatile contaminants and biodegradation by-products of both volatile and non-volatile contaminants from the groundwater aquifer and the soil.

2. The method of claim 1 wherein, in the step of establishing a plurality of well nests, in the well nest each extraction well is within ten feet of an injection well.

3. The method of claim 2 wherein, in the step of establishing a plurality of well nests, in the well nest each extraction well is adjacent to an injection well within a same bore hole.

4. The method of claim 1 additionally comprising the step of providing microorganisms into the subsurface.

5. The method of claim 4 additionally comprising the step of providing nutrients/food to the microorganisms in the subsurface.

6. The method of claim 5 wherein, in the step of providing nutrients/food, the nutrients/food comprise organic compounds.

7. The method of claim 6 wherein, in the step of providing nutrients/food, the nutrients/food comprise inorganic compounds.

8. The method of claim 1 further comprising the step of heating the oxygen-containing gas injected into the injection wells to stimulate microbial metabolism.

9. The method of claim 8 wherein the step of heating the oxygen-containing gas comprises the step of heating by solar heating.

10. The method of claim 1 additionally comprising the steps of:
   c) sampling contaminated soil or water;
   d) isolating at least one microorganism useful in biodegrading the contaminants;
   e) fermenting the isolated microorganisms to increase their population; and
   f) inserting the fermented microorganisms into the subsurface.

11. The method of claim 1 additionally comprising the steps of:
   c) providing an elongated tube reservoir capped at one end;
   d) providing entry ports in the elongated tube reservoir;
   e) surrounding the entry ports with filtration means; and
   f) collecting contaminants in the elongated tube reservoir by passage thereof through the filtration means.

12. The method of claim 11 wherein the step of providing an elongated tube reservoir comprises providing the reservoir in one or more of the extraction wells.

13. The method of claim 11 wherein the step of providing an elongated tube reservoir comprises providing the reservoir in one or more of the injection wells.

14. The method of claim 11 wherein the step of providing an elongated tube reservoir comprises providing the reservoir in one or more wells separate from the extraction and injection wells.

15. The method of claim 1 additionally comprising the steps of:
   c) impregnating fluid with microorganisms useful in biodegradation of the contaminant;
   d) confining the impregnated fluid to one or more containers; and
   e) bubbling contaminants from the extraction wells through the impregnated fluid within the containers.

16. The method of claim 1 wherein the step of extracting effluent comprises the further step of venting extracted gases to ambient air.

17. An apparatus for in situ air sparging, vacuum extraction and bioremediation for removal of contaminants from soil and from groundwater present in the soil in the form of a groundwater aquifer, there being a vadose soil zone existing down to a water table defining the upper boundary of the groundwater aquifer, said apparatus comprising:
   a plurality of well nests, each well nest comprising one or more injection wells extending through the vadose zone to a depth below the water table and one or more extraction wells in the vadose zone extending to a depth above the water table;
   means for injecting oxygen-containing gas into the injection wells, wherein said oxygen-containing gas continuously stimulates microorganisms present in the vadose zone by substantially maximizing available oxygen, thereby increasing the rate of biodegradation of volatile and non-volatile contaminants in said soil and said groundwater;
   means for applying a vacuum to one or more extraction wells at a negative flow which is volumetrically greater than the positive flow of gas injected into the injection wells; and
   means for extracting, via the extraction wells, an effluent containing volatile contaminants and biodegradation by-products of both volatile and non-volatile contaminants from said groundwater aquifer and said soil.

18. The apparatus of claim 17 wherein in said well nest each extraction well is within ten feet of an injection well.

19. The apparatus of claim 18 wherein in said well nest each extraction well is adjacent to an injection well within a same bore hole.

20. The apparatus of claim 17 additionally comprising means for providing microorganisms into the subsurface.

21. The apparatus of claim 20 additionally comprising means for providing nutrients/food to the microorganisms in the subsurface.

22. The apparatus of claim 17 further comprising means for heating the oxygen-containing gas injected into said injection wells in order to simulate microbial metabolism.

23. The apparatus of claim 22 wherein said means for heating the oxygen-containing gas comprises means for heating by solar heating.

24. The apparatus of claim 17 additionally comprising:
   means for sampling contaminated soil or water;
   means for isolating at least one microorganism useful in biodegrading the contaminants;
   means for fermenting the isolated microorganisms to increase their population; and
   means for inserting the fermented microorganisms into the subsurface.

25. The apparatus of claim 17 additionally comprising:
   an elongated tube reservoir spaced at one end having entry ports therein;
   filtration means surrounding said entry ports; and
   means for collecting in said elongated tube reservoir contaminants which pass through said filtration means.

26. The apparatus of claim 25 additionally comprising means for providing said elongated tube reservoir in one or more of said extraction wells.

27. The apparatus of claim 25 additionally comprising means for providing said elongated tube reservoir in one or more of said injection wells.

28. The apparatus of claim 25 additionally comprising means for providing said elongated tube reservoir to a well separate from said extraction and injection wells.

29. The apparatus of claim 17 additionally comprising:
   means for impregnating fluid with microorganisms useful in biodegradation of the contaminant;
   one or more containers confining said impregnated fluid; and
   means for bubbling contaminants from said extraction wells through said impregnated fluid within said containers.

30. The apparatus of claim 17 wherein said means for extracting effluent further comprises means for venting extracted gases into ambient air.

* * * * *